United States Patent
Fukushiro et al.

(10) Patent No.: US 8,182,398 B2
(45) Date of Patent: May 22, 2012

(54) CONTROL APPARATUS AND CONTROL METHOD FOR AUTOMATIC TRANSMISSION

(75) Inventors: Eiji Fukushiro, Nagoya (JP); Keisuke Ota, Toyota (JP); Koji Oshima, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 701 days.

(21) Appl. No.: 12/376,686

(22) PCT Filed: Sep. 5, 2007

(86) PCT No.: PCT/JP2007/067697
§ 371 (c)(1),
(2), (4) Date: Feb. 6, 2009

(87) PCT Pub. No.: WO2008/029951
PCT Pub. Date: Mar. 13, 2008

(65) Prior Publication Data
US 2011/0315499 A1    Dec. 29, 2011

(30) Foreign Application Priority Data
Sep. 8, 2006  (JP) ................................. 2006-244345

(51) Int. Cl.
*F16H 59/20*    (2006.01)
*B60W 10/04*   (2006.01)
*G06F 7/00*     (2006.01)

(52) U.S. Cl. ........................... 477/133; 477/115; 701/59

(58) Field of Classification Search .................. 477/115, 477/127, 128, 131, 132, 133, 135, 136, 140, 477/141; 701/59, 60, 61
See application file for complete search history.

(56) References Cited

U.S. PATENT DOCUMENTS

| | | | |
|---|---|---|---|
| 5,315,898 A | 5/1994 | Koyama et al. | |
| 5,393,279 A | 2/1995 | Bota et al. | |
| 6,346,063 B1 | 2/2002 | Kondo et al. | |
| 6,832,976 B2* | 12/2004 | Nishida et al. | 477/120 |
| 7,905,814 B2* | 3/2011 | Lee | 477/144 |
| 7,914,417 B2* | 3/2011 | Lee | 477/148 |
| 2002/0086760 A1 | 7/2002 | Hayabuchi et al. | |
| 2002/0151409 A1* | 10/2002 | Hayabuchi et al. | 477/158 |

(Continued)

FOREIGN PATENT DOCUMENTS

JP    04-370458 A    12/1992

(Continued)

OTHER PUBLICATIONS

Office Action dated Sep. 14, 2011, in corresponding Japanese Patent Application No. 2006-244345.

(Continued)

*Primary Examiner* — Roger Pang
(74) *Attorney, Agent, or Firm* — Sughrue Mion, PLLC

(57) ABSTRACT

An ECU executes a program including the steps of: starting monitoring the turbine revolution speed and the output shaft revolution speed when a direct shift is started; performing complete disengagement control on a disengagement element; lowering control pressure of a disengagement element to preliminarily fixed control pressure; starting engagement control on an engagement element when a set time period Ts passes; performing complete disengagement control on the disengagement element when a set time period Ts passes; and starting the engagement control on an engagement element when turbine revolution speed NT is equal to or larger than (the synchronous revolution speed of a gear after a shift—a set value Ns).

15 Claims, 13 Drawing Sheets

U.S. PATENT DOCUMENTS

| | | |
|---|---|---|
| 2004/0158382 A1 | 8/2004 | Furuichi et al. |
| 2007/0105682 A1 | 5/2007 | Inuta |

FOREIGN PATENT DOCUMENTS

| | | | |
|---|---|---|---|
| JP | 05-126244 A | 5/1993 | |
| JP | 2001-065680 A | 3/2001 | |
| JP | 2001-132835 A | 5/2001 | |
| JP | 2002-195402 A | 7/2002 | |
| JP | 2002-310280 A | 10/2002 | |
| JP | 2002-310281 A | 10/2002 | |
| JP | 2003-106438 A | 4/2003 | |
| JP | 2003-106440 A | 4/2003 | |
| JP | 2004-245246 A | 9/2004 | |
| JP | 2007-100787 A | 4/2007 | |
| WO | 03/029699 A1 | 4/2003 | |

OTHER PUBLICATIONS

Japanese Office Action issued Jan. 17, 2012 for Japanese Application No. 2010-255154.

* cited by examiner

FIG. 3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGEMENT
× DISENGAGEMENT
◎ ENGAGEMENT AT THE TIME OF ENGINE BRAKING
△ ENGAGEMENT ONLY AT THE TIME OF DRIVING

F I G. 1 1
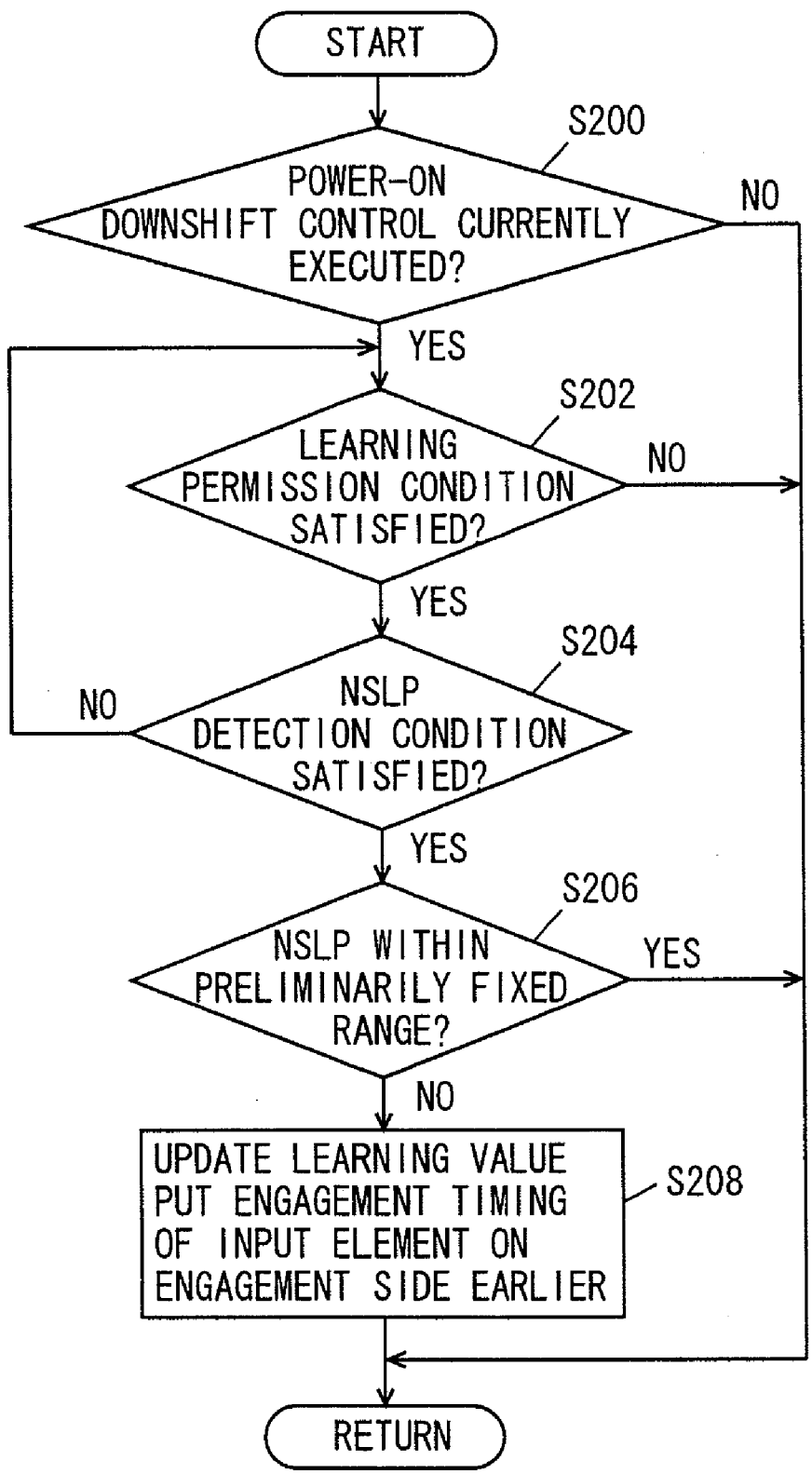

CONTROL APPARATUS AND CONTROL METHOD FOR AUTOMATIC TRANSMISSION

TECHNICAL FIELD

The present invention relates to control of an automatic transmission, particularly to control of completing a shift requiring switchover of two or more friction engagement elements for a short time while suppressing shift shock.

BACKGROUND ART

Constituent parts of an automatic transmission of a vehicle include a planetary gear element formed by rotation elements such as a sun gear, a ring gear and a planetary gear, and friction engagement elements. In such an automatic transmission, any of a plurality of gears is implemented by switching a transmission channel of torque transmitted from an engine by switching a combination between the friction engagement elements to be engaged. Particularly, in an automatic transmission having a number of gears (such as a six-gear automatic transmission), a plurality of clutch elements serving as input elements and a plurality of brake elements serving as reaction elements are provided.

In such an automatic transmission, in a case where a shift is performed over gears having plural gears inbetween by a shift operation, an acceleration demand or the like, both the input elements and the reaction elements may be switched so as to perform the shift. In this case, after an intermediate gear is implemented by switching one of the input elements and the reaction elements, the other are switched so that the shift is performed.

Such shift control of performing switchover in two steps via the intermediate gear is already known. For example, WO2003/029699 discloses a shift control apparatus for an automatic transmission capable of quickly responding to a demand and smoothly achieving dual switchover control, even in a case where a driver changes a shift intention and requests another gear at the time of a shift to be achieved by a plurality of switchover control operations, after the change in a target gear is inhibited. This shift control apparatus is a shift control apparatus for an automatic transmission provided with shift control means for achieving a plurality of forward gears by engagement and disengagement control on a plurality of friction elements relating to a shift of the automatic transmission. The shift control apparatus is characterized by including dual switchover shift determining means for determining a shift from a Nth gear achieved by bringing a first friction element and a second friction element at least into an engaged state, to a (N-α)th gear achieved by bringing at least the first friction element and the second friction element into a disengaged state and engaging a third friction element and a fourth friction element having at least one intermediate gear between the Nth gear and the (N-α)th gear achieved by engaging the second friction element and the third friction element; jump shift control means for achieving the shift from the Nth gear to the (N-α)th gear by disengaging the first friction element and engaging the fourth friction element at least at the time of determination of dual switchover shift, lowering engagement force of the second friction element before a gear ratio reaches a gear ratio corresponding to the intermediate gear, and disengaging the second friction element and engaging the third friction element at least after passage of the gear ratio through the gear ratio corresponding to the intermediate gear; target gear ratio change inhibiting means for determining to inhibit the target gear from being changed from the (N-α)th gear at predetermined timing after start of the shift from the Nth gear to the (N-α)th gear until an end of the shift control; and target gear ratio change permitting means for rechecking the shift intention of the driver when the gear ratio reaches the gear ratio corresponding to the intermediate gear, and permitting the gear of the target gear ratio from being changed to a gear corresponding to the intention of the driver when the gear of the target gear ratio differs from the (N-α)th gear, even if the change in the gear of the target gear ratio is inhibited.

According to the shift control apparatus for the automatic transmission disclosed in the above patent literature, when the driver intends to change the gear, it is possible to achieve the shift for a short time. When the driver does not intend to change the gear, oil pressure of an H/C is lowered before reaching a gear ratio corresponding to a fifth gear. Therefore, the shift is not settled and there is no generation of a plurality of shift shock in the duel switchover. Thereby, it is possible to achieve a smooth duel switchover shift.

In the shift control apparatus disclosed in the above patent literature, when the gear ratio reaches the gear ratio corresponding to the intermediate gear, the shift to the target gear is inhibited in accordance with the shift intention of the driver at the time of a shift over the gears having plural gears inbetween. However, in a case where there is no change in the intention of the driver, control of changing to the target gear is performed after implementing the intermediate gear. That is, the switchover from the second friction element to the third friction element is performed after performing the switchover from the first friction element to the fourth friction element so that the intermediate gear is completely implemented. Therefore, a time period of a shift action may be elongated.

Alternatively, in a case where the switchover of the first friction element and the second friction element is performed in parallel, there is a rotation element with the revolution speed not detected in the automatic transmission until engagement of the third friction element and engagement of the fourth friction element after disengagement of the first friction element and disengagement of the second friction element. Therefore, the shift shock may be generated at a time point when the third friction element and the fourth friction element are engaged.

DISCLOSURE OF THE INVENTION

An object of the present invention is to provide a control apparatus and a control method for an automatic transmission of improving a response property of a shift and preventing shift shock at the same time.

A control apparatus for an automatic transmission according to an aspect of the present invention is a control apparatus for an automatic transmission where a gear of a first gear ratio is implemented by engaging a first friction element and engaging a second friction element, and a gear of a second gear ratio is implemented by engaging a third friction element and engaging a fourth friction element both different from the first friction element and the second friction element. This control apparatus includes a first disengagement controller to lower engagement force of the first friction element so as to disengage the first friction element at the time of a shift from the gear of the first gear ratio to the gear of the second gear ratio, a half-engagement controller to lower engagement force of the second friction element to preliminarily fixed engagement force with the disengagement of the first friction element, a first engagement controller to increase engagement force of the third friction element at a first time point after starting the shift, a second disengagement controller to further lower the engagement force of the second friction element so as to disengage the second friction element with the engagement of the third friction element, and a second engagement controller to increase engagement force of the fourth friction element at a second time point later than the first time point.

According to the present invention, with regard to the first friction element and the second friction element for implementing the gear of the first gear ratio, the first friction element is disengaged and the second friction element is disengaged so as to be in a half-engaged state of the preliminarily fixed engagement force. The third friction element is engaged at the first time point while the second friction element is in the half-engaged state. Therefore, a state is brought closer to an intermediate gear. At this time, since the second friction element is disengaged and the fourth friction element is engaged at the second time point, the gear of the second gear ratio is implemented. In such a way, the engagement force of both the first friction element and the second friction element are controlled at the same time and the third friction element and the fourth friction element are engaged at the first time point and the second time point respectively. Thereby, in comparison to a case where switchover of the second friction element and the third friction element and switchover of the first friction element and the fourth friction element are stepwise performed, there is no need for completely implementing the intermediate gear and hence it is possible to complete a shift action for a short time. Since there is no need for completely implementing the intermediate gear, a change in the revolution speed of an engine is not stagnated in the middle of the shift. Therefore, the response property of the shift is improved. Further, for example when a time point when a shift state of the automatic transmission is synchronized with the intermediate gear implemented by the second friction element and the third friction element is the first time point, it is possible to suppress the shift shock at the time of engaging the third friction element by engaging the third friction element at the first time point. When a time point when the shift state of the automatic transmission is synchronized with the gear of the second gear ratio is the second time point, it is possible to suppress the shift shock at the time of engaging the fourth friction element by engaging the fourth friction element at the second time point. Therefore, it is possible to provide the control apparatus and a control method for the automatic transmission of improving the response property of the shift and preventing the shift shock at the same time.

Preferably, the preliminarily fixed engagement force is engagement force of regulating a rotation element of the automatic transmission until the third friction element is engaged after starting the engagement and a slip is generated in the second friction element engaged by said preliminarily fixed engagement force due to torque transmitted via the rotation element when e third friction element is engaged.

According to the present invention, before starting the engagement of the third friction element, since the second friction element is engaged with the preliminarily fixed engagement force, the rotation element of the automatic transmission is regulated. Therefore, it is possible to bring the state of the automatic transmission closer to the intermediate gear by engaging the third friction element at the first time point. When the third friction element is in the engaged state, the slip is generated in the second friction element. Therefore, it is possible to prevent rotation of the rotation element of the automatic transmission from being regulated by the revolution speed of synchronizing with the intermediate gear implemented by the second friction element and the third friction element. Thereby, the output shaft revolution speed of the automatic transmission can be not stagnated but changed at the synchronous revolution speed with the intermediate gear. Therefore, since the fourth friction element can be engaged at the revolution speed where the rotation element of the automatic transmission is synchronized with the gear of the second gear ratio, it is possible to improve the response property of the shift action.

More preferably, the automatic transmission includes a fluid coupling with an input shaft coupled to a power source and a transmission mechanism connected to an output shaft of the fluid coupling. The first time point is substantially the same as a time point when the input shaft revolution speed of the transmission mechanism is the revolution speed of synchronizing with an intermediate gear implemented by the engagement of the second friction element and the engagement of the third friction element.

According to the present invention, when the third friction element is engaged at substantially the same time point as the time point when the input shaft revolution speed is the revolution speed of synchronizing with the intermediate gear implemented by the engagement of the second friction element and the third friction element, the third friction element can be engaged while the state of the automatic transmission is closer to the intermediate gear. Therefore, it is possible to suppress generation of the shift shock at the time of engaging the third friction element.

More preferably, the first time point is a time point of passing a set time period corresponding to a time point of synchronizing with the intermediate gear after a time point when the first friction element or the second friction element is disengaged.

According to the present invention, when the third friction element is engaged at the time point of passing the set time period after the time point when the first friction element or the second friction element is disengaged, the set time period corresponds to the time point of synchronizing with the intermediate gear. Therefore, the third friction element can be engaged while the state of the automatic transmission is closer to the intermediate gear. Consequently, it is possible to suppress the generation of the shift shock at the time of engaging the third friction element.

More preferably, the control apparatus further includes a first detector to detect the input shaft revolution speed of the fluid coupling, a second detector to detect the output shaft revolution speed of the fluid coupling, and a learning unit to learn the first time point based on the input shaft revolution speed and the output shaft revolution speed.

According to the present invention, when the shift is performed from the gear of the first gear ratio to the gear of the second gear ratio, a difference in the revolution speed may be generated between the input shaft and the output shaft of the fluid coupling depending on a time point when the third friction element is engaged. This is generated because the input shaft revolution speed of the transmission mechanism (that is, the output shaft revolution speed of the fluid coupling) is lowered so as to be the revolution speed of synchronizing with the intermediate gear when the third friction element is engaged later than the time point of synchronizing with the intermediate gear. At this time, positive torque is generated in the transmission mechanism so that the shift shock is generated. Therefore, when learning that the first time point is put earlier based on the input shaft revolution speed and the output shaft revolution speed of the fluid coupling, the third friction element can be engaged at a proper time point. Consequently, it is possible to suppress the generation of the shift shock at the time of engaging the third friction element so as to smoothly perform the shift action.

More preferably, the learning unit learns the first time point based on a difference between the input shaft revolution speed and the output shaft revolution speed.

According to the present invention, a slip amount of the fluid coupling can be detected based on the difference between the input shaft revolution speed and the output shaft revolution speed. Therefore, it is possible to detect a decrease in the output shaft revolution speed of the fluid coupling in the middle of the shift from the gear of the first gear ratio to the gear of the second gear ratio. Consequently, the third friction element can be engaged at a proper time point by learning the first time point based on the difference between the input shaft revolution speed and the output shaft revolution speed of the fluid coupling (for example, putting the first time point earlier in a case where the difference is large). Therefore, it is possible to suppress the generation of the shift shock at the time of engaging the third friction element so as to smoothly perform the shift action.

More preferably, the learning unit learns that the first time point is put earlier as the difference between the input shaft revolution speed and the output shaft revolution speed is larger.

According to the present invention, as the difference between the input shaft revolution speed the output shaft revolution speed is larger, the slip amount of the fluid coupling is larger. At the time of a shift from the gear of the first gear ratio to the gear of the second gear ratio, as the engagement of the third friction element is later from the time point of synchronizing with the intermediate gear, a reduction amount of the output shaft revolution speed of the fluid coupling is larger so that the slip amount is increased. Therefore, the third friction element can be engaged at a proper time point of synchronizing with the intermediate gear by learning that the first time point is put earlier as the difference between the input shaft revolution speed and the output shaft revolution speed is larger. Consequently, it is possible to suppress the generation of the shift shock at the time of engaging the third friction element so as to smoothly perform the shift action.

More preferably, the control apparatus further includes an input shaft revolution speed detector to detect the input shaft revolution speed of the transmission mechanism. The second time point is a time point when a difference between the detected input shaft revolution speed and the revolution speed of synchronizing with the gear of the second gear ratio is equal to or smaller than a set value.

According to the present invention, since the fourth friction element is engaged at the time point when the difference between the input shaft revolution speed of the transmission mechanism and the revolution speed of synchronizing with the gear of the second gear ratio is equal to or smaller than the set value, it is possible to suppress the generation of the shift shock at the time of engaging the fourth friction element so as to smoothly perform the shift action.

More preferably, the control apparatus further includes an output shaft revolution speed detector to detect the output shaft revolution speed of the transmission mechanism, and a time point learning unit to learn the first time point based on the detected output shaft revolution speed.

According to the present invention, at the time of the shift from the gear of the first gear ratio to the gear of the second gear ratio, when the third friction element is engaged before the shift state of the automatic transmission is synchronized with the intermediate gear, the shift shock may be generated. This is generated because the input shaft revolution speed of the transmission mechanism may be increased so as to be the revolution speed of synchronizing with the intermediate gear when the third friction element is engaged before the time point when the input shaft revolution speed of the transmission mechanism is synchronized with the intermediate gear. At this time, negative torque is generated in the transmission mechanism so that the shift shock is generated. Therefore, the third friction element can be engaged at a proper time point by learning that the first time point is put later or the like based on the output shaft revolution speed of the transmission mechanism. Consequently, it is possible to suppress the generation of the shift shock at the time of engaging the third friction element so as to smoothly perform the shift action.

More preferably, the time point learning unit learns the first time point based on a time variation of the detected output shaft revolution speed.

According to the present invention, it is possible to determine whether or not the shift shock is generated due to earlier engagement of the third friction element by detecting the time variation of the output shaft revolution speed. Thereby, the third friction element can be engaged at a proper time point by learning that the first time point is put later or the like. Therefore, it is possible to suppress the generation of the shift shock at the time of engaging the third friction element so as to smoothly perform the shift action.

BRIEF DESCRIPTION OF THE DRAWINGS

FIG. 3 is a working table of the automatic transmission.

FIG. 11 is a flowchart of a program of learning a set time period Ts (1) to be executed by the ECU serving as the control apparatus for the automatic transmission according to the present embodiment.

BEST MODES FOR CARRYING OUT THE INVENTION

Figure 1:
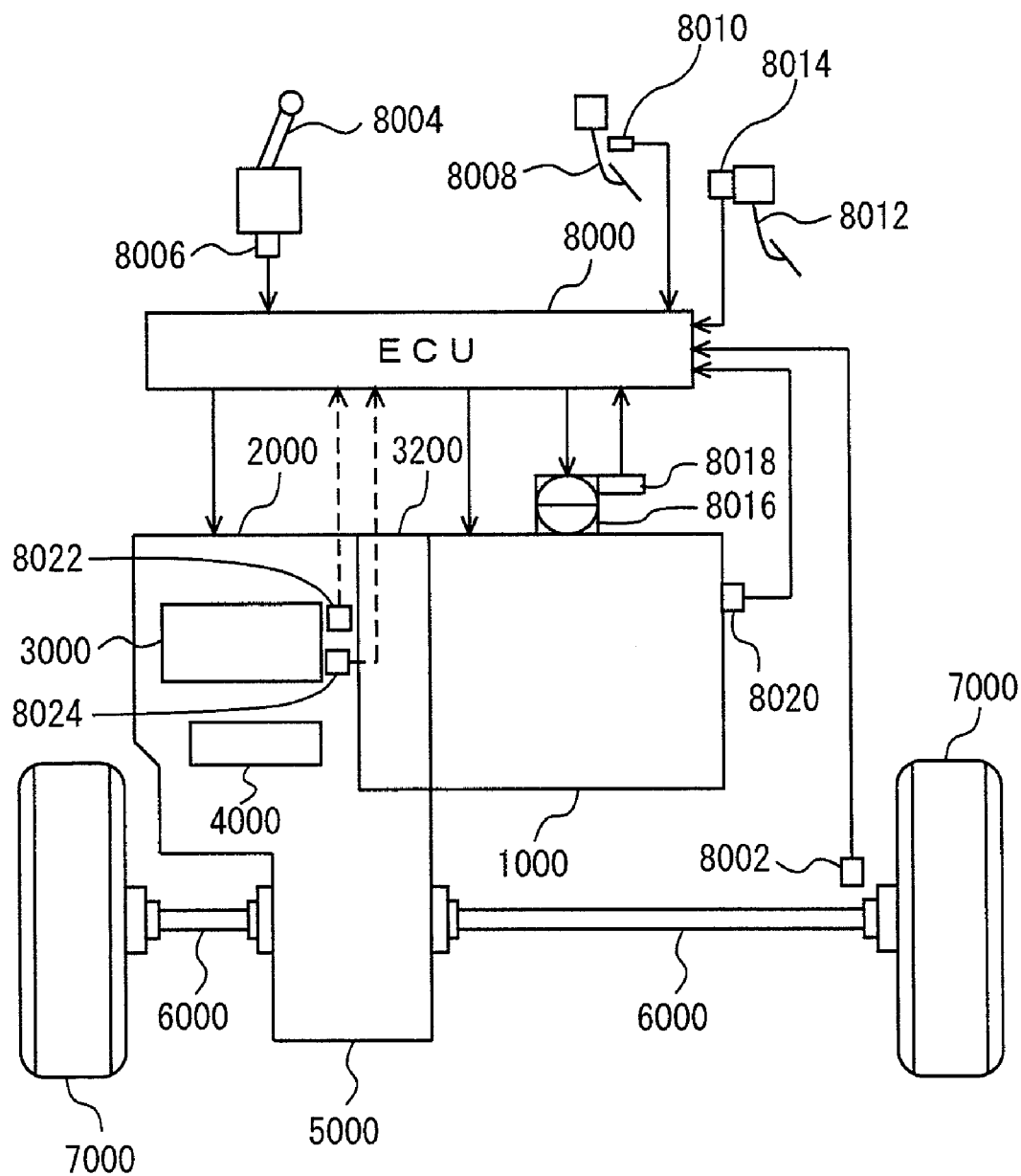
FIG. 1 is a schematic configuration diagram showing a powertrain to be controlled by an ECU serving as a control apparatus according to an embodiment of the present invention.

Hereinafter, an embodiment of the present invention will be described with reference to the drawings. In the following description, the same parts are given the same reference numerals. Names and functions thereof are the same. Therefore, a detailed description thereof will not be repeated.

[First Embodiment]

With reference to FIG. 1, a vehicle with a control apparatus according to the embodiment of the present invention installed will be described. This vehicle is a FF (Front engine Front drive) vehicle. It should be noted that the vehicle may be a vehicle other than the FF vehicle.

The vehicle includes an engine 1000, an automatic transmission 2000, a planetary gear unit 3000 forming a part of automatic transmission 2000, an oil hydraulic circuit 4000 forming a part of automatic transmission 2000, a differential gear 5000, a drive shaft 6000, front wheels 7000, and an ECU (Electronic Control Unit) 8000. The control apparatus for the automatic transmission according to the present invention is realized by ECU 8000.

Engine 1000 is an internal combustion engine for burning a mixture of a fuel injected from an injector (not shown) and the air inside a combustion chamber of a cylinder. A piston in the cylinder is pushed down by the combustion and a crankshaft is rotated.

Automatic transmission 2000 is coupled to engine 1000 via a torque converter 3200. Automatic transmission 2000 performs a shift of the revolution speed of the crankshaft to the desired revolution speed by implementing a desired gear.

An output gear of automatic transmission 2000 is meshed with differential gear 5000. Drive shaft 6000 is coupled to differential gear 5000 by spline-fitting or the like. Mechanical power is transmitted to the left and right front wheels 7000 via drive shaft 6000.

A vehicle speed sensor 8002, a position switch 8006 of a shift lever 8004, an accelerator pedal position sensor 8010 of an accelerator pedal 8008, a stroke sensor 8014 of a brake pedal 8012, a throttle opening position sensor 8018 of an electronic throttle valve 8016, an engine speed sensor 8020, an input shaft speed sensor 8022, and an output shaft speed sensor 8024 are connected to ECU 8000 via a harness and the like.

Vehicle speed sensor 8002 detects vehicle speed from the revolution speed of drive shaft 6000 and transmits a signal representing a detection result to ECU 8000. A position of shift lever 8004 is detected by position switch 8006, and a signal representing a detection result is transmitted to ECU 8000. A gear of automatic transmission 2000 is automatically implemented corresponding to the position of shift lever 8004. A driver may select a manual shift mode capable of selecting a gear arbitrarily in accordance with operations of the driver.

Accelerator pedal position sensor 8010 detects a position of accelerator pedal 8008 and transmits a signal representing a detection result to ECU 8000. Stroke sensor 8014 detects a stroke amount of brake pedal 8012 and transmits a signal representing a detection result to ECU 8000.

Throttle opening position sensor 8018 detects an opening position of electronic throttle valve 8016 adjusted by an actuator and transmits a signal representing a detection result to ECU 8000. An air amount to be taken in engine 1000 (output of engine 1000) is adjusted by electronic throttle valve 8016.

Engine speed sensor 8020 detects the revolution speed of an output shaft (crankshaft) of engine 1000 and transmits a signal representing a detection result to ECU 8000. Input shaft speed sensor 8022 detects input shaft revolution speed (hereinafter, also referred to as the turbine revolution speed) NT of automatic transmission 2000 and transmits a signal representing a detection result to ECU 8000. Output shaft speed sensor 8024 detects output shaft revolution speed NO of automatic transmission 2000 and transmits a signal representing a detection result to ECU 8000. It should be noted that an output shaft of engine 1000 is connected to an input shaft of torque converter 3200 and an output shaft of torque converter 3200 is connected to an input shaft of automatic transmission 2000. Therefore, the output shaft revolution speed of engine 1000 is the same revolution speed as the input shaft revolution speed of torque converter 3200. The input shaft revolution speed of automatic transmission 2000 is the same revolution speed as the output shaft revolution speed of torque converter 3200.

ECU 8000 controls devices so that the vehicle is in a desired traveling state based on the signals transmitted from vehicle speed sensor 8002, position switch 8006, accelerator pedal position sensor 8010, stroke sensor 8014, throttle opening position sensor 8018, engine speed sensor 8020, input shaft speed sensor 8022, output shaft speed sensor 8024 and the like, a map and a program stored in a ROM (Read Only Memory).

In the present embodiment, ECU 8000 controls automatic transmission 2000 so that any of first to sixth gears is implemented in a case where a D (drive) range is selected as a shift range of automatic transmission 2000 by placing shift lever 8004 at a D (drive) position. Since any of the first to sixth gears is implemented, automatic transmission 2000 is capable of transmitting drive force to front wheels 7000.

ECU 8000 controls automatic transmission 2000 so as to be in a neutral state (mechanical power transmission shutting state) in a case where an N (neutral) range is selected as the shift range of automatic transmission 2000 by placing shift lever 8004 at an N (neutral) position.

Figure 2:
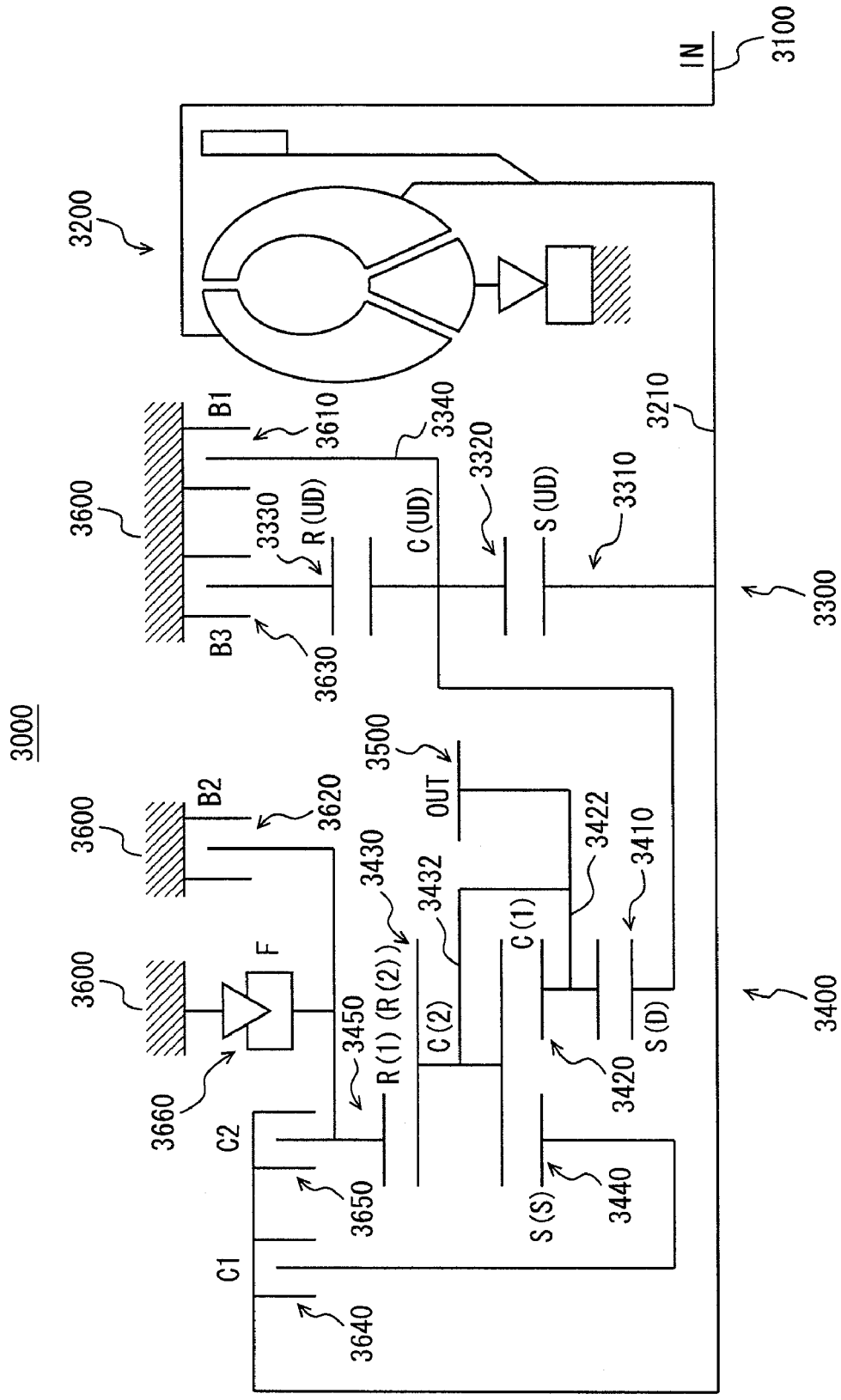
FIG. 2 is a skeleton diagram showing a gear train of an automatic transmission.

With reference to FIG. 2, planetary gear unit 3000 provided in automatic transmission 2000 will be described. Planetary gear unit 3000 is connected to torque converter 3200 having an input shaft 3100 coupled to the crankshaft. Planetary gear unit 3000 includes a first set of planetary gear mechanism 3300, a second set of planetary gear mechanism 3400, an output gear 3500, B1, B2 and B3 brakes 3610, 3620 and 3630 fixed to a gear case 3600, C1 and C2 clutches 3640 and 3650, and a one-way clutch F 3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to an output shaft 3210 of torque converter 3200. Pinion gear 3320 is rotatably supported on carrier C (UD) 3340. Pinion gear 3320 is meshed with sun gear S (UD) 3310 and ring gear R (UD) 3330.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

Sun gear S (D) 3410 is coupled to carrier C (UD) 3340. Short pinion gear 3420 is rotatably supported on carrier C (1) 3422. Short pinion gear 3420 is meshed with sun gear S (D) 3410 and long pinion gear 3430. Carrier C (1) 3422 is coupled to output gear 3500.

Long pinion gear 3430 is rotatably supported on carrier C (2) 3432. Long pinion gear 3430 is meshed with short pinion gear 3420, sun gear S (S) 3440 and ring gear R (1) (R (2)) 3450. Carrier C (2) 3432 is coupled to output gear 3500.

Sun gear S (S) 3440 is coupled to output shaft 3210 of torque converter 3200 by C1 clutch 3640. Ring gear R (1) (R (2)) 3450 is fixed to gear case 3600 by B2 brake 3620 and coupled to output shaft 3210 of torque converter 3200 by C2 clutch 3650. Ring gear R (1) (R (2)) 3450 is coupled to one-way clutch F 3660 and disabled in rotation during drive in the first gear.

One-way clutch F 3660 is provided in parallel with B2 brake 3620. That is, an outer race of one-way clutch F 3660 is fixed to gear case 3600, and an inner race is coupled to ring gear R (1) (R (2)) 3450 via a rotation shaft.

FIG. 3 shows a table illustrating a relationship between gears and working states of clutch elements and brake elements. First to sixth forward gears and a reverse gear are implemented by operating the brake elements and the clutch elements with combinations shown in this table.

As shown in FIG. 3, C1 clutch 3640 is engaged in all the first to fourth gears. That is, C1 clutch 3640 can be called as an input clutch in the first to fourth gears. C2 clutch 3650 is engaged in the fifth gear and the sixth gear. That is, C2 clutch 3650 can be called as an input clutch in the fifth gear and the sixth gear.

It should be noted that although a case where the present invention is applied to the automatic transmission having two input clutches is described in the present embodiment, the automatic transmission is not particularly limited as long as having two or more input clutches.

Figure 4:
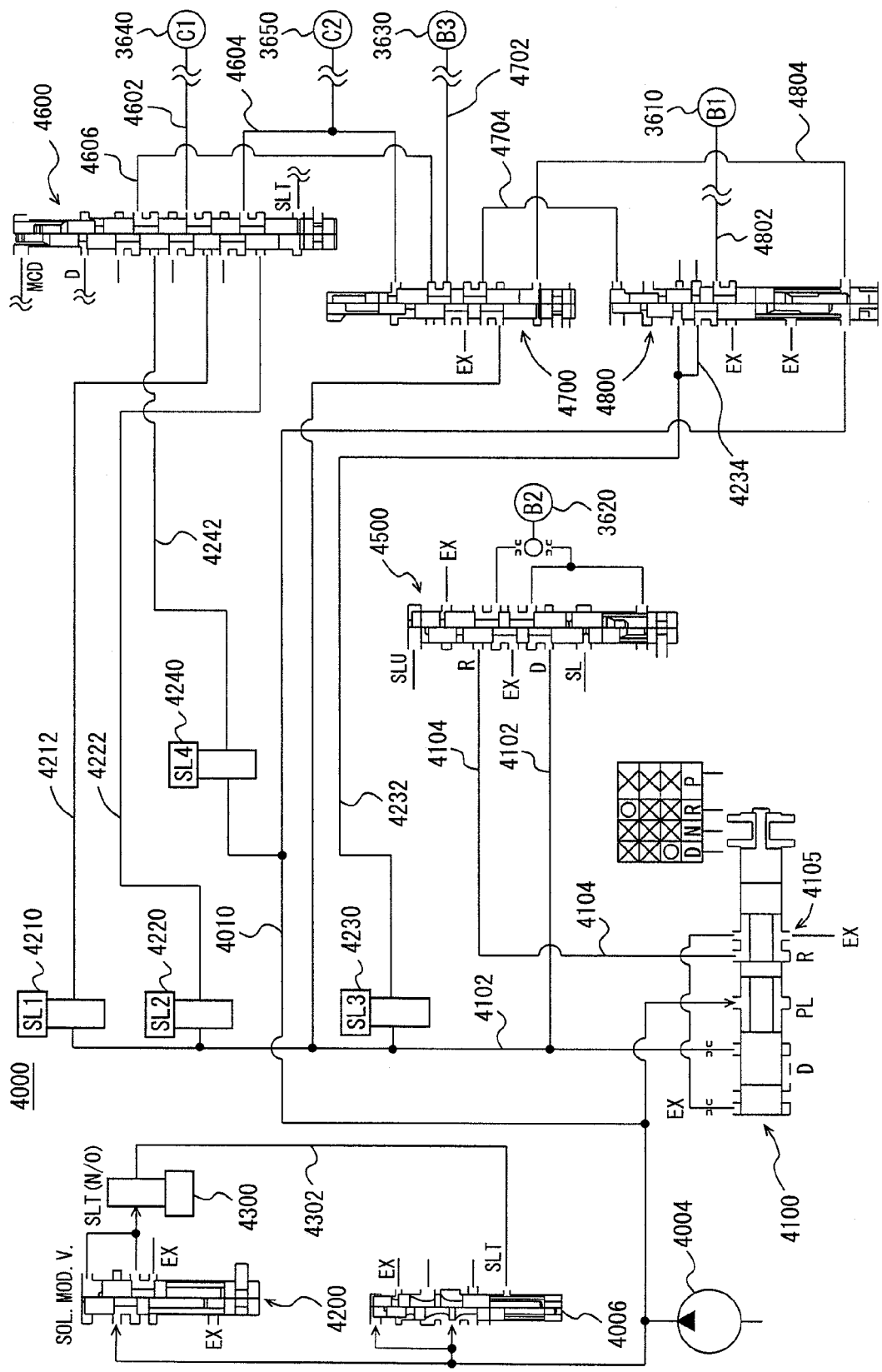
FIG. 4 is a diagram showing a part of an oil hydraulic circuit in the automatic transmission.

With reference to FIG. 4, a principal portion of oil hydraulic circuit 4000 will be described. It should be noted that oil hydraulic circuit 4000 is not limited to the one described below.

Oil hydraulic circuit 4000 includes an oil pump 4004, a primary regulator valve 4006, a manual valve 4100, a solenoid modulator valve 4200, an SL1 linear solenoid (hereinafter, indicated as SL (1)) 4210, an SL2 linear solenoid (hereinafter, indicated as SL (2)) 4220, an SL3 linear solenoid (hereinafter, indicated as SL (3)) 4230, an SL4 linear solenoid (hereinafter, indicated as SL (4)) 4240, an SLT linear solenoid (hereinafter, indicated as SLT) 4300, a B2 control valve 4500, a sequence valve 4600, a clutch applying control valve 4700, and an B1 applying control valve 4800.

Oil pump 4004 is coupled to the crankshaft of engine 1000. Oil pump 4004 is driven by rotation of the crankshaft so as to generate oil pressure. The oil pressure generated in oil pump 4004 is adjusted by primary regulator valve 4006 so as to generate line pressure.

Primary regulator valve 4006 is operated taking throttle pressure adjusted by SLT 4300 as pilot pressure. The line pressure is supplied to manual valve 4100 and SL (4) 4240 via a line pressure oil channel 4010.

Manual valve 4100 includes a drain port 4105. The oil pressure of a D range pressure oil channel 4102 and an R range pressure oil channel 4104 is discharged from drain port 4105. In a case where a spool of manual valve 4100 is at the D position, line pressure oil channel 4010 communicates with D range pressure oil channel 4102. Therefore, the oil pressure is supplied to D range pressure oil channel 4102. At this time, R range pressure oil channel 4104 communicates with drain port 4105. Therefore, R range pressure of R range pressure oil channel 4104 is discharged from drain port 4105.

In a case where the spool of manual valve 4100 is at the R position, line pressure oil channel 4010 communicates with R range pressure oil channel 4104. Therefore, the oil pressure is supplied to R range pressure oil channel 4014. At this time, D range pressure oil channel 4102 communicates with drain port 4105. Therefore, hydraulic fluid in D range pressure oil channel 4102 is discharged from drain port 4105.

In a case where the spool of manual valve 4100 is at the N position, both D range pressure oil channel 4102 and R range pressure oil channel 4104 communicate with drain port 4105. Therefore, the D range pressure of D range pressure oil channel 4102 and the hydraulic fluid in R range pressure oil channel 4104 are discharged from drain port 4105.

The oil pressure supplied to D range pressure oil channel 4102 (hereinafter, also referred to as the D range pressure) is supplied to clutch applying control valve 4700 via SL (1) 4210, SL (2) 4220, SL (3) 4230 and an oil channel 4106. The D range pressure is eventually supplied to B1 brake 3610, B2 brake 3620, C1 clutch 3640 and C2 clutch 3650. The R range pressure is eventually supplied to B2 brake 3620.

Solenoid modulator valve 4200 adjusts the oil pressure to be supplied to SLT 4300 (solenoid modulator pressure) to be constant pressure taking the line pressure as base pressure.

SLT 4300 adjusts the solenoid modulator pressure in accordance with a control signal from ECU 8000 based on the accelerator pedal position detected by accelerator pedal position sensor 8010 so as to generate the throttle pressure. The throttle pressure is supplied to primary regulator valve 4006 via an SLT oil channel 4302. The throttle pressure is utilized as the pilot pressure of primary regulator valve 4006.

B2 control valve 4500 selectively supplies the oil pressure from one of D range pressure oil channel 4102 and R range pressure oil channel 4104 to B2 brake 3620. D range pressure oil channel 4102 and R range pressure oil channel 4104 are connected to B2 control valve 4500. B2 control valve 4500 is controlled by the oil pressure supplied from an SL solenoid valve (not shown) and an SLU solenoid valve (not shown), and the urge of a spring.

In a case where the SL solenoid valve is OFF and the SLU solenoid valve is ON, B2 control valve 4500 attains the left side state of FIG. 4. In this case, B2 brake 3620 is supplied with oil pressure having the D range pressure adjusted taking the oil pressure supplied from the SLU solenoid valve as the pilot pressure.

In a case where the SL solenoid valve is ON and the SLU solenoid valve is OFF, B2 control valve 4500 attains the right side state of FIG. 4. In this case, B2 brake 3620 is supplied with the R range pressure.

SL (1) 4210 adjusts the oil pressure supplied to C1 clutch 3640 via sequence valve 4600. SL (2) 4220 adjusts the oil pressure supplied to C2 clutch 3650 via sequence valve 4600. SL (3) 4230 adjusts the oil pressure supplied to B1 brake 3610 via B1 applying control valve 4800. SL (4) 4240 adjusts the oil pressure supplied to B3 brake 3630 via sequence valve 4600 and clutch applying control valve 4700.

It should be noted that SL (1) 4210, SL (2) 4220, SL (3) 4230, SL (4) 4240 and SLT 4300 are controlled by the control signal sent from ECU 8000.

SL (1) 4210 and sequence valve 4600 are connected by an oil channel 4212. SL (2) 4220 and sequence valve 4600 are connected by an oil channel 4222. SL (4) 4240 and sequence valve 4600 are connected by an oil channel 4242.

Sequence valve 4600 is controlled by the oil pressure supplied from SLT 4300 and solenoid modulator valve 4200, and the urge of the spring.

It should be noted that sequence valve 4600 attains the right side state of FIG. 4 in the case where the spool of manual valve 4100 is at the D position and in a normal state. At this time, oil channel 4212 communicates with an oil channel 4602 connected to C1 clutch 3640. Oil channel 4222 communicates with an oil channel 4604 connected to C2 clutch 3650. Further, oil channel 4242 communicates with an oil channel 4606 connected to clutch applying control valve 4700. Oil channels 4602, 4604 and 4606 are connected to clutch applying control valve 4700.

Clutch applying control valve 4700 attains the right side state of FIG. 4 in the gear other than the fourth gear. Specifically, clutch applying control valve 4700 is controlled by the oil pressure supplied from oil channel 4602 to an upper part of a spool, the oil pressure supplied from oil channel 4604 to the side of the upper part of the spool, the line pressure supplied from an oil channel 4804 to a lower part of the spool via an oil channel 4012 and B1 applying control valve 4800, and the urge of the spring.

In the fourth gear, the oil pressure adjusted by SL (1) 4210 and SL (2) 4220 is supplied to C1 clutch 3640 and C2 clutch 3650 so that C1 clutch 3640 and C2 clutch 3650 are engaged. At this time, when force of pushing down the spool based on the oil pressure supplied from oil channels 4602 and 4604 to the side of the upper part of the spool exceeds total force based on the line pressure supplied to the side of the lower part of the spool and the urge of the spring, clutch applying control valve 4700 attains the left side state of FIG. 4.

At this time, oil channel 4106 communicates with an oil channel 4704 connected to an upper part of a spool of B1 applying control valve 4800. Therefore, the D range pressure is supplied to the upper part of the spool of B1 applying control valve 4800 via oil channel 4106 and oil channel 4704.

Meanwhile, in the gears other than the fourth gear, the oil pressure adjusted by SL (1) 4210 and SL (2) 4220 is supplied to one of C1 clutch 3640 and C2 clutch 3650 so that one of C1 clutch 3640 and C2 clutch 3650 is engaged. At this time, when the force of pushing down the spool based on the oil pressure supplied from oil channels 4602 and 4604 to the upper part of the spool is less than the total force based on the line pressure supplied to the lower part of the spool and the urge of the spring, clutch applying control valve 4700 attains the right side state of FIG. 4. Therefore, oil channel 4606 communicates with an oil channel 4702 connected to B3 brake 3630.

B1 applying control valve 4800 is controlled by the oil pressure supplied from oil channel 4704 to the upper part of the spool, the oil pressure supplied from oil channel 4702 connected to B3 brake 3630 to the side of the upper part of the spool, the oil pressure supplied from oil channel 4012 diverted from and connected to oil channel 4010 to a lower part of the spool, the oil pressure supplied from an oil channel 4232 to the side of the upper part of the spool, and the urge of the spring.

When the oil pressure is supplied to oil channel 4702 connected to B3 brake 3630, force of pushing down the spool based on the oil pressure supplied to the side of the upper part of the spool exceeds total force based on the oil pressure supplied to the lower part of the spool and the urge of the spring. Therefore, B1 applying control valve 4800 attains the right side state of FIG. 4.

Meanwhile, when the oil pressure supplied to oil channel 4702 connected to B3 brake 3630 is decreased, the force of pushing down the spool based on the oil pressure supplied to the side of the upper part of the spool is less than the total force based on the oil pressure supplied to the lower part of the spool and the urge of the spring. Therefore, B1 applying control valve 4800 attains the left side state of FIG. 4.

SL (3) 4230 is connected to B1 applying control valve 4800 via oil channel 4232. An oil channel 4234 diverted in the middle of oil channel 4232 is further connected to B1 applying control valve 4800. When B1 applying control valve 4800 attains the left side state of FIG. 4, oil channel 4234 communicates with an oil channel 4802 connected to B1 brake 3610.

For example, a case where switchover from C1 clutch 3640 to C2 clutch 3650 and switchover from B3 brake 3630 to B1 brake 3610 are stepwise performed via an intermediate gear (the third gear) in a shift from the fifth gear to the second gear in the above configuration of the vehicle will be described with reference to FIG. 5.

In oil hydraulic circuit 4000, the fifth gear is implemented in a state that the oil pressure is supplied from SL (2) 4220 to C2 clutch 3650 via sequence valve 4600 and the oil pressure is supplied from SL (4) 4240 to B3 brake 3630 via sequence valve 4600 and clutch applying control valve 4700.

At this time, clutch applying control valve 4700 attains the right side state of FIG. 4. Meanwhile, B1 applying control valve 4800 attains the right side state of FIG. 4.

When the shift from the fifth gear to the second gear is performed, firstly, C2 clutch 3650 is disengaged and then the C1 clutch 3640 is engaged. Therefore, C2 clutch 3650 and C1 clutch 3640 are switched over. In such a way, the shift from the fifth gear to the third gear serving as the intermediate gear is performed. Further, B3 brake 3630 is disengaged and B1 brake 3610 is engaged. Therefore, B3 brake 3630 and B1 brake 3610 are switched over. In such a way, the shift from the third gear to the second gear is performed.

More specifically, when the shift from the fifth gear to the second gear is started based on a shift command output from ECU 8000 to oil hydraulic circuit 4000, instruction pressure of SL (4) 4240 is increased. Therefore, as shown in (A) of FIG. 5, control pressure (also called as engagement pressure in the following description) of B3 brake 3630 is increased at time Ta (0). Meanwhile, instruction pressure of SL (2) 4220 is decreased. Therefore, as shown in (B) of FIG. 5, control pressure of C2 clutch 3650 is lowered at time Ta (1).

As the control pressure of C2 clutch 3650 is lowered, instruction pressure of SL (1) 4210 is increased. Therefore, as shown in (C) of FIG. 5, control pressure of C1 clutch 3640 is increased at time Ta (2). At this time, the control pressure of C1 clutch 3640 is increased, the control pressure of C2 clutch 3650 is decreased and B3 brake 3630 is in an engaged state in automatic transmission 2000. Therefore, implementation of the third gear is started.

Figure 5:
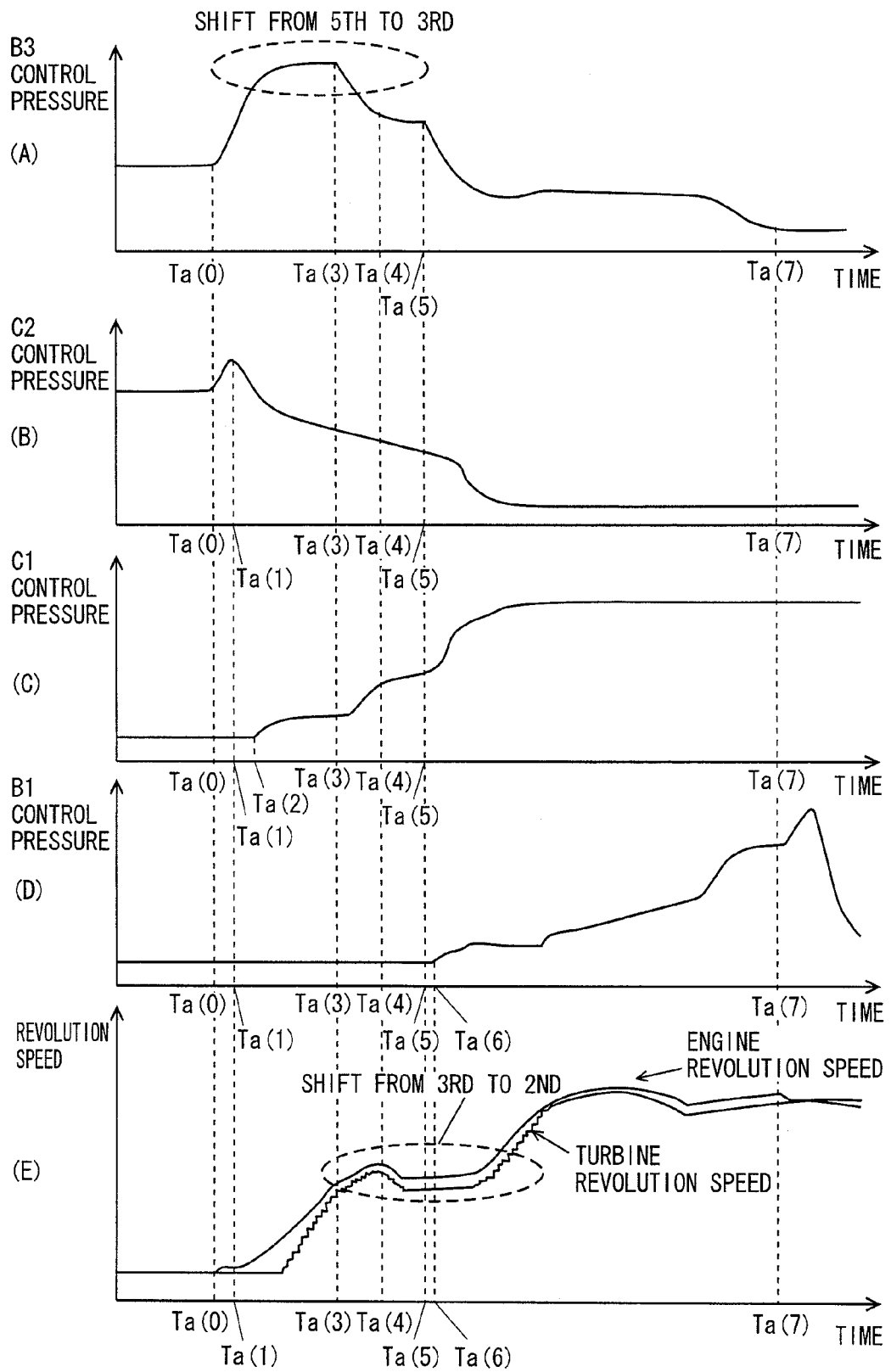
FIG. 5 is a timing chart when switchover of a clutch element and switchover of a brake element are stepwise executed at the time of a shift from a fifth gear to a second gear.

Due to a decrease in the instruction pressure of SL (4) 4240 at time Ta (3), the control pressure of B3 brake 3630 is lowered as shown in (A) of FIG. 5. Due to a further increase in the instruction pressure of SL (1) 4210, the control pressure of C1 clutch 3640 is increased as shown in (C) of FIG. 5.

Since the third gear is implemented at time Ta (4), engine revolution speed NE and turbine revolution speed NT are lowered to the revolution speed corresponding to the third gear and stagnated as shown in (E) of FIG. 5.

Due to a further decrease in the instruction pressure of SL (4) 4240 at time Ta (5), the control pressure of B3 brake 3630 is lowered as shown in (A) of FIG. 5. Accordingly, due to a further increase in the instruction pressure of SL (1) 4210, the control pressure of C1 clutch 3640 is increased as shown in (C) of FIG. 5.

Due to an increase in instruction pressure of SL (3) 4230 at time Ta (6), control pressure of B1 brake 3610 is increased as shown in (D) of FIG. 5. That is, the shift from the third gear to the second gear is started.

The control pressure of C1 clutch 3640 and B1 brake 3610 is increased and the control pressure of B3 brake 3630 is decreased. Therefore, as shown in (E) of FIG. 5, engine revolution speed NE and turbine revolution speed NT are increased to the revolution speed corresponding to the second gear and then stagnated at the revolution speed corresponding to the second gear. That is, the shift is completed at time Ta (7).

In such a way, at the time of the shift from the fifth gear to the second gear, when the third gear is implemented as the intermediate gear, engine revolution speed NE and turbine revolution speed NT are stagnated at the revolution speed of synchronizing with the intermediate gear and then increased to the revolution speed of synchronizing with the second gear in accordance with implementation of the second gear.

Therefore, in a case where the shift is performed by stepwise performing the switchover of C1 clutch 3640 and C2 clutch 3650 and the switchover of B3 brake 3630 and B1 brake 3610, there is a possibility that a response property of the shift is deteriorated. Alternatively, the gear after the shift is implemented after the intermediate gear is completely implemented. Therefore, there is a possibility that a long time is required from the start to the end of the shift.

When C2 clutch 3650 and B3 brake 3630 are disengaged at the same time, it is not possible to recognize a rotation state of the rotation element in automatic transmission 2000. Therefore, shift shock may be generated at a time point when C1 clutch 3640 and B1 brake 3610 are engaged.

The present invention is characterized by a point that ECU 8000 controls automatic transmission 2000 (more specifically, various solenoids provided in oil hydraulic circuit 4000) as described below. That is, ECU 8000 controls automatic transmission 2000 to lower engagement force of a first friction element so as to disengage the first friction element at the time of the shift from a gear of a first gear ratio to a gear of a second gear ratio. ECU 8000 controls automatic transmission 2000 to lower engagement force of a second friction element to preliminarily fixed engagement force with the disengagement of the first friction element. Further, ECU 8000 controls automatic transmission 2000 to increase engagement force of a third friction element at a first time point after starting the shift. ECU 8000 controls automatic transmission 2000 to further lower the engagement force of the second friction element so as to disengage the second friction element with the engagement of the third friction element. ECU 8000 controls automatic transmission 2000 to increase engagement force of a fourth friction element at a second time point later than the first time point.

It should be noted that a "gear of a first gear ratio" indicates the fifth gear in the present embodiment. A "gear of a second gear ratio" indicates the second gear. The "first friction element" indicates B3 brake 3630. The "second friction element" indicates C2 clutch 3650. The "third friction element" indicates C1 clutch 3640. The "fourth friction element" indicates B1 brake 3610.

That is, more specifically, ECU 8000 controls SL (4) 4240 to lower the control pressure of B3 brake 3630 at the time of the shift from the fifth gear to the second gear. ECU 8000 controls SL (4) 4240 to disengage B3 brake 3630.

ECU 8000 controls SL (2) 4220 to lower the control pressure of C2 clutch 3650 to preliminarily fixed control pressure with the disengagement of B3 brake 3630.

ECU 8000 controls SL (1) 4210 to increase the control pressure of C1 clutch 3640 at substantially the same time point as a time point when the input shaft revolution speed (turbine revolution speed NT) of planetary gear unit 3000 serving as the transmission mechanism is the revolution speed of synchronizing with the fourth gear implemented by the engagement of C2 clutch 3650 and C1 clutch 3640 after starting the shift.

ECU 8000 controls SL (2) 4220 to further lower the control pressure of C2 clutch 3650 with the engagement of C1 clutch 3640.

ECU 8000 controls SL (3) 4230 to increase the control pressure of B1 brake 3610 at a time point when a difference between the input shaft revolution speed (turbine revolution speed NT) of planetary gear unit 3000 and the revolution speed of synchronizing with the second gear is equal to or smaller than a set value.

The "preliminarily fixed control pressure (engagement force)" is not particularly limited as long as regulating the rotation element of planetary gear unit 3000 until C1 clutch 3640 is engaged after starting the engagement and a slip is generated in C2 clutch 3650 engaged by the preliminarily fixed engagement force due to torque transmitted via the rotation element when C1 clutch 3640 is engaged.

Hereinafter, a configuration of ECU 8000 in the present embodiment will be described with reference to a functional block diagram of FIG. 6.

Figure 6:
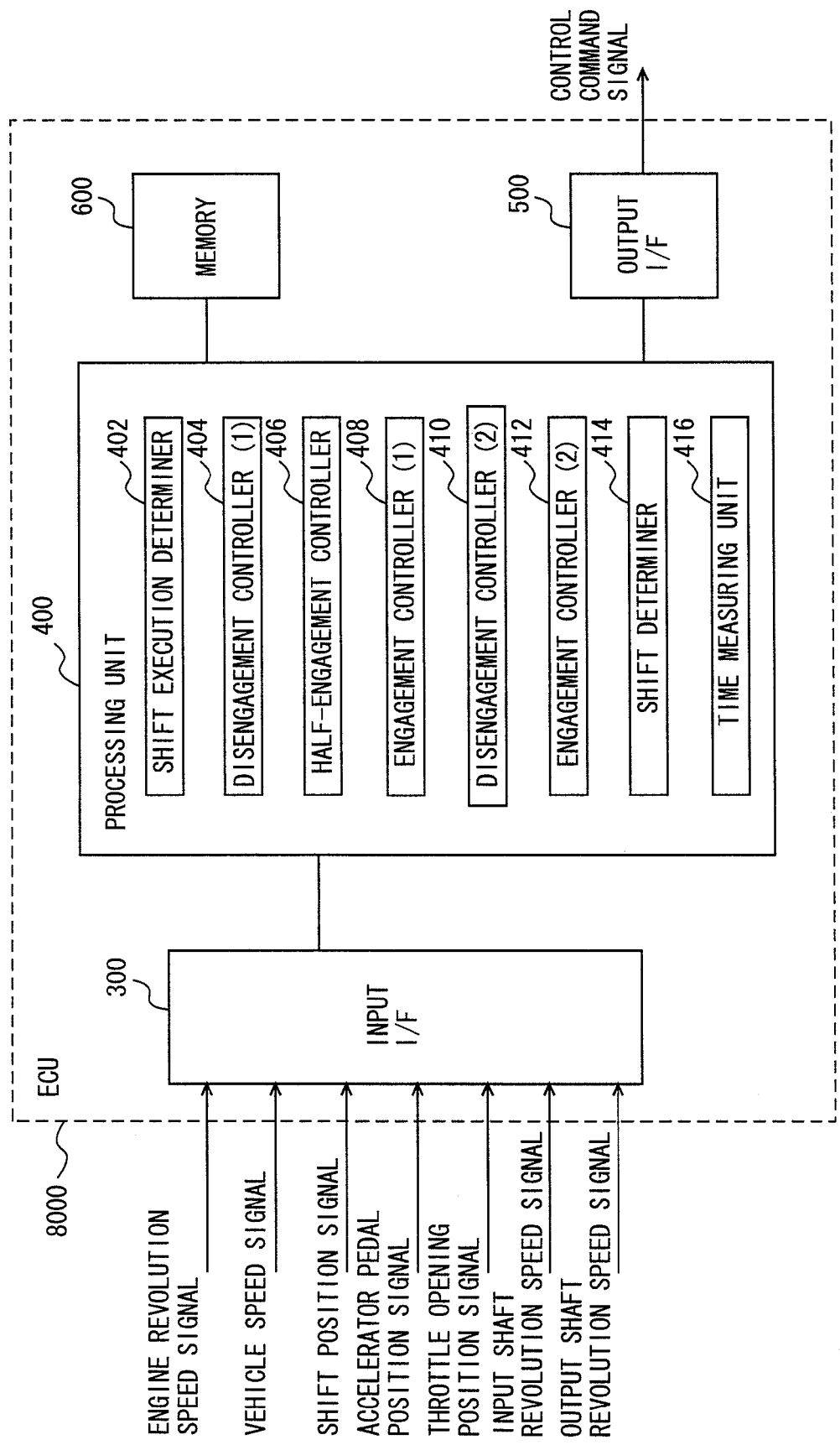
FIG. 6 is a functional block diagram of the ECU serving as the control apparatus for the automatic transmission according to the present embodiment.

As shown in FIG. 6, an input interface (hereinafter, described as an input I/F) 300 for receiving signals from various sensors, a processing unit 400 mainly formed by a CPU (Central Processing Unit), a memory 600 realized by the ROM mentioned above or the like for storing various information such as a threshold value and a map and various programs, and an output interface (hereinafter, described as an output I/F) 500 for sending a control command based on an arithmetic result of processing unit 400 to oil hydraulic circuit 4000 are provided in ECU 8000.

In the present embodiment, input I/F 300 receives an engine revolution speed signal, a vehicle speed signal, a shift position signal, an accelerator pedal position signal, a throttle opening position signal, an input shaft revolution speed signal and an output shaft revolution speed signal.

Processing unit 400 includes a shift execution determiner 402, a disengagement controller (1) 404, a half-engagement controller 406, an engagement controller (1) 408, a disengagement controller (2) 410, an engagement controller (2) 412, and a shift determiner 414.

Shift execution determiner 402 determines whether or not a direct shift from the fifth gear to the second gear is to be executed. The "direct shift" indicates that a shift over gears having plural gears inbetween such as the shift from the sixth gear to the third gear and the shift from the fifth gear to the second gear is directly performed without completely implementing the intermediate gear. For example, when a plurality of downshift lines from the fifth gear to the fourth gear, from the fourth gear to the third gear and from the third gear to the second gear are continuously crossed over in a shift map stored in memory 600 based on a current gear based on the detected accelerator pedal position, the vehicle speed, and a ratio between the input shaft revolution speed and the output shaft revolution speed, shift execution determiner 402 determines that the direct shift from the fifth gear to the second gear is to be executed. It should be noted that for example, when it is determined that the direct shift from the fifth gear to the second gear is to be executed, shift execution determiner 402 turns a direct shift execution flag on.

At the time of executing the shift from the fifth gear to the second gear, disengagement controller (1) 404 generates a control command signal so as to disengage B3 brake 3630 and transmits the control command signal to oil hydraulic circuit 4000 via output I/F 500. For example, when the direct shift execution flag from the fifth gear to the second gear is turned on or when a preliminarily fixed time period passes after turning on, disengagement controller (1) 404 generates the control command signal so as to lower the control pressure of B3 brake 3630.

Half-engagement controller 406 generates a control command signal so that the control pressure of C2 clutch 3650 is the preliminarily fixed control pressure with the disengagement of B3 brake 3630 and transmits the control command signal to oil hydraulic circuit 4000 via output I/F 500. For example, when the direct shift execution flag from the fifth gear to the second gear is turned on or when a preliminarily fixed time period passes after turning on, half-engagement controller (1) 406 generates the control command signal so that the control pressure of C2 clutch 3650 is the preliminarily fixed control pressure.

Engagement controller (1) 408 generates a control command signal so as to increase the control pressure of C1 clutch 3640 and transmits the control command signal to oil hydraulic circuit 4000 via output I/F 500 at substantially the same time point as the time point when the input shaft revolution speed of planetary gear unit 3000 is the revolution speed of synchronizing with the fourth gear implemented by the engagement of C2 clutch 3650 and C1 clutch 3640 after starting the shift.

In the present embodiment, engagement controller (1) 408 generates a control command signal so as to increase the control pressure of C1 clutch 3640 after passing a set time period after the control command signal on B3 brake 3630 is transmitted. The set time period is a time period set so as to correspond to the time point when the input shaft revolution speed of planetary gear unit 3000 is the revolution speed of synchronizing with the fourth gear after the command signal on B3 brake 3630 is transmitted. The set time period is measured by a time measuring unit 416.

Disengagement controller (2) 410 generates a control command signal so as to further lower the control pressure of C2 clutch 3650 with the engagement of C1 clutch 3640 and transmits the control command signal to oil hydraulic circuit 4000 via output I/F 500.

In the present embodiment, disengagement controller (2) 410 generates the control command signal so as to further lower the control pressure of C2 clutch 3650 after passing a preliminarily fixed time period after engagement controller (1) 408 transmits the control command signal. The preliminarily fixed time period is measured by time measuring unit 416.

Engagement controller (2) 412 generates a control command signal so as to increase the control pressure of B1 brake 3610 and transmits the control command signal to oil hydraulic circuit 4000 via output I/F 500 at substantially the same time point as the time point when the input shaft revolution speed of planetary gear unit 3000 is the revolution speed of synchronizing with the second gear.

In the present embodiment, engagement controller (2) 412 generates the control command signal so as to increase the control pressure of B1 brake 3610 at the time point when the difference between the input shaft revolution speed of planetary gear unit 3000 and the revolution speed of synchronizing with the second gear is equal to or smaller than a set value.

When a ratio between turbine revolution speed NT and output shaft revolution speed NO is substantially the same as a gear ratio corresponding to the gear after the shift (the second shift), shift determiner 414 determines that the shift is completed. When it is determined that the shift is completed, shift determiner 414 turns a gear engagement determination flag on.

Time measuring unit 416 is a timer for measuring passed time by setting a count value to be an initial value at a time point when measurement of the passed time is started and adding a preliminarily fixed count value for every calculation cycle.

It should be noted that shift execution determiner 402, disengagement controller (1) 404, half-engagement controller 406, engagement controller (1) 408, disengagement controller (2) 410, engagement controller (2) 412, shift determiner 414 and time measuring unit 416 function as software realized by executing the program stored in memory 600 by the CPU serving as processing unit 400 in the present embodiment. However, the above units may be realized by hardware. It should be noted that such a program is recorded on a recording medium and installed in the vehicle.

Figure 7:
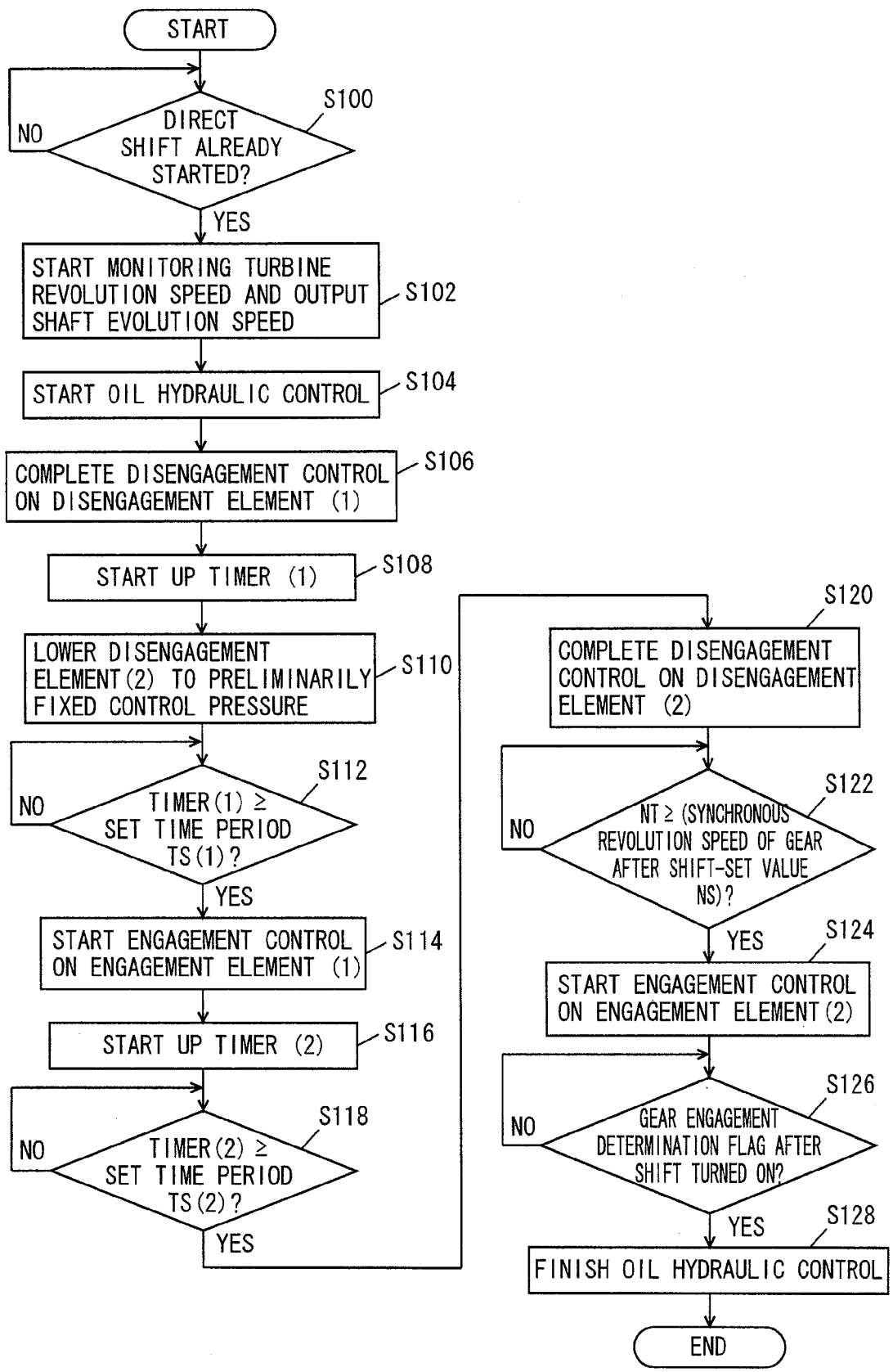
FIG. 7 is a flowchart showing a control structure of a program to be executed by the ECU serving as the control apparatus for the automatic transmission according to the present embodiment.

Hereinafter, with reference to FIG. 7, a control structure of the program to be executed by ECU 8000 serving as the control apparatus for the automatic transmission according to the present embodiment will be described.

In Step (hereinafter, described as S) 100, ECU 8000 determines whether or not the direct shift is already started. When the direct shift is already started (YES in S100), the processing is moved to S102. If not (NO in S100), the program is held until the direct shift is started.

In S102, ECU 8000 starts monitoring a change in turbine revolution speed NT and output shaft revolution speed NO. It should be noted that ECU 8000 may be set so as to always monitor the change in turbine revolution speed NT and output shaft revolution speed NO.

In S104, ECU 8000 starts oil hydraulic control. In S106, ECU 8000 controls oil hydraulic circuit 4000 so as to completely disengage a disengagement element (1). In the present embodiment, "disengagement element (1)" indicates B3 brake 3630. That is, ECU 8000 controls SL (4) 4240 so as to lower the control pressure of B3 brake 3630.

In S108, ECU 8000 starts up a timer (1) and starts measuring time. In S110, ECU 8000 controls oil hydraulic circuit 4000 so as to lower control pressure of a disengagement element (2) to the preliminarily fixed control pressure. In the present embodiment, "disengagement element (2)" indicates C2 clutch 3650. That is, ECU 8000 controls SL (2) 4220 so as to lower the control pressure of C2 clutch 3650 to be the preliminarily fixed control pressure.

In S112, ECU 8000 determines whether or not a count value of timer (1) is equal to or larger than a value corresponding to a set time period Ts (1). When the count value is equal to or larger than the value corresponding to set time period Ts (1) (YES in S112), the processing is moved to S114. If not (NO in S112), the program is held until the count value is equal to or larger than the value corresponding to set time period Ts (1).

In S114, ECU 8000 controls oil hydraulic circuit 4000 so as to increase control pressure of an engagement element (1). In the present embodiment, "engagement element (1)" indicates C1 clutch 3640. That is, ECU 8000 controls SL (1) 4210 so as to increase the control pressure of C1 clutch 3640.

In S116, ECU 8000 starts up a timer (2) and starts measuring time. In S118, ECU 8000 determines whether or not a count value of timer (2) is equal to or larger than a value corresponding to a set time period Ts (2). When the count value is equal to or larger than the value corresponding to set time period Ts (2) (YES in S118), the processing is moved to S120. If not (NO in S118), the program is held until the count value is equal to or larger than the value corresponding to set time period Ts (2).

In S120, ECU 8000 controls oil hydraulic circuit 4000 so as to completely disengage disengagement element (2) (C2 clutch 3650).

In S122, ECU 8000 determines whether or not turbine revolution speed NT is equal to or larger than (the synchronous revolution speed of the gear after the shift—a set value Ns). When turbine revolution speed NT is equal to or larger than (synchronous revolution speed of the gear after the shift—set value Ns) (YES in S122), the processing is moved to S124. If not (NO in S122), the program is held until turbine revolution speed NT is equal to or larger than (synchronous revolution speed of the gear after the shift—set value Ns).

In S124, ECU 8000 controls oil hydraulic circuit 4000 so as to increase control pressure of an engagement element (2). In the present embodiment, "engagement element (2)" indicates B1 brake 3610. That is, ECU 8000 controls SL (3) 4230 so as to increase the control pressure of B1 brake 3610.

In S126, ECU 8000 determines whether or not the gear engagement determination flag after the shift is turned on. When the gear engagement determination flag after the shift is turned on (YES in S126), the processing is moved to S128. If not (NO in S126), the program is held until the gear engagement determination flag after the shift is turned on. In S128, ECU 8000 finishes the oil hydraulic control.

An action of ECU 8000 serving as the control apparatus for the automatic transmission according to the present embodiment based on the above structure and flowchart will be described with reference to FIG. 8 taking the direct shift from the fifth gear to the second gear as an example.

For example, it is supposed that the fifth gear is implemented in automatic transmission 2000. At this time, C2 clutch 3650 and B3 brake 3630 are engaged.

When accelerator pedal 8008 is pressed by the driver, a throttle opening position is increased. Therefore, engine revolution speed NE is increased. With the increase in engine revolution speed NE, engine torque output from engine 1000 is increased. Then, output shaft torque of automatic transmission 2000 is increased.

When the driver presses the accelerator pedal or the like, a relationship between the vehicle speed and the accelerator pedal position in the shift map is changed. When a position in the shift map specified by the vehicle speed and the accelerator pedal position continuously crosses over the downshift lines from the fifth gear to the fourth gear, from the fourth gear to the third gear and from the third gear to the second gear, ECU 8000 determines to start the direct shift (YES in S100). At this time, the monitoring on turbine revolution speed NT and output shaft revolution speed NO is started (S102) and the oil hydraulic control is started (S104).

When the oil hydraulic control is started, disengagement control is started so as to completely disengage B3 brake 3630 (S106). When the disengagement control is started, as shown in (A) of FIG. 8, the control pressure of B3 brake 3630 is once increased at time Tb (0) and then starts decreasing at time Tb (1).

At a time point when the disengagement control on B3 brake 3630 is started, timer (1) is started up (S108). Then, half-engagement control is started so as to lower the control pressure of C2 clutch 3650 to the preliminarily fixed control pressure (S110). When the control pressure of C2 clutch 3650 is lowered to the preliminarily fixed control pressure, as shown in (B) of FIG. 8, the control pressure of C2 clutch 3650 is once increased at time Tb (0) and then starts decreasing at time Tb (1), and the preliminarily fixed control pressure is maintained at time Tb (3).

Since B3 brake 3630 is disengaged and C2 clutch 3650 is half-engaged, a degree of transmitting the engine torque of engine 1000 to the output shaft side is lowered. Therefore, as shown in (G) of FIG. 8, the output shaft torque is lowered at time Tb (1) or later. As shown in (E) of FIG. 8, engine revolution speed NE is increased since a rotation load of engine 1000 due to automatic transmission 2000 is lowered.

Figure 8:
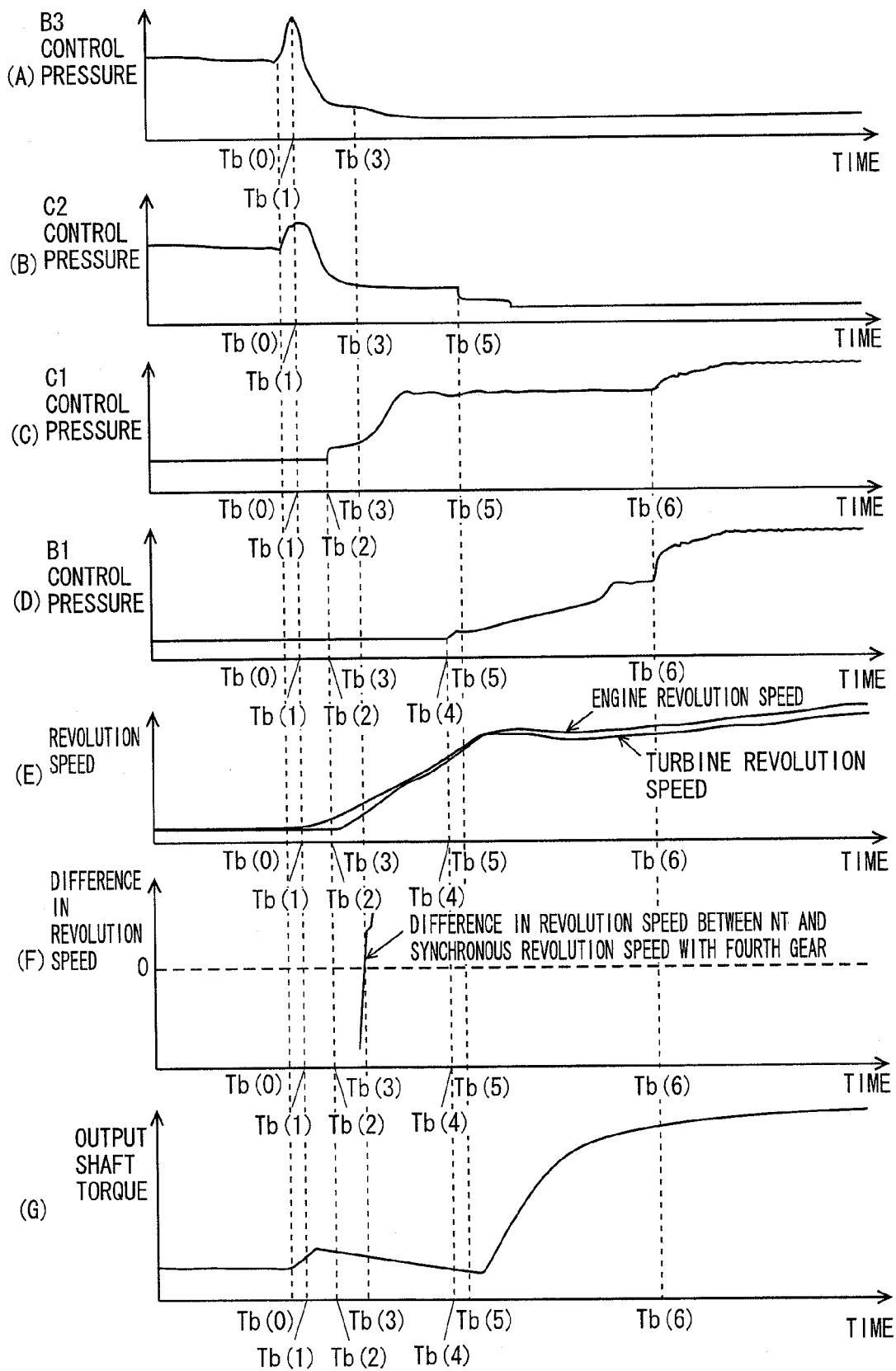
FIG. 8 is a timing chart showing an action of the ECU serving as the control apparatus for the automatic transmission according to the present embodiment.

When the count value of timer (1) is equal to or larger than the value corresponding to set time period Ts (1) (YES in S112), as shown in (C) of FIG. 8, engagement control is started so as to increase the control pressure of C1 clutch 3640 at time Tb (2) (S114).

At this time, as shown in (F) of FIG. 8, the control pressure of C1 clutch 3640 is further increased at a time point when a difference between turbine revolution speed NT and the synchronous revolution speed with the fourth gear is substantially zero. Since C1 clutch 3640 is engaged at the time point when the difference between the turbine revolution speed and the synchronous revolution speed with the fourth gear is substantially zero, the shift shock at the time of engaging C1 clutch 3640 is suppressed.

With the engagement control on C1 clutch 3640 being started, timer (2) is started up (S116). When the count value of timer (2) is equal to or larger than the value corresponding to set time period Ts (2) (YES in S118), the disengagement control is started so as to completely disengage C2 clutch 3650 (S120). When the disengagement control is started, as shown in (B) of FIG. 8, C2 clutch 3650 is substantially completely disengaged at time Tb (5).

When turbine revolution speed NT is equal to or larger than (the synchronous revolution speed of the second gear—set value Ns) (YES in S122), the engagement control is started so as to increase the control pressure of B1 brake 3610 (S124). When the engagement control on B1 brake 3610 is started, as shown in (D) of FIG. 8, the control pressure of B1 brake 3610 is increased at time Tb (4) or later.

When it is determined that the ratio between turbine revolution speed NT and output shaft revolution speed NO is substantially the same as a gear ratio of the second gear at time Tb (6), the gear engagement determination flag of the second gear is turned on (YES in S126). Therefore, the oil hydraulic control is finished (S128).

As mentioned above, in accordance with the control apparatus for the automatic transmission according to the present embodiment, the engagement force of both the B3 brake and the C2 clutch are controlled at the same time, the C1 clutch is engaged at the time point of synchronizing with the fourth gear and the B1 brake is engaged at the time point of synchronizing with the second gear. Thereby, in comparison to a case where the switchover of the C2 clutch and the C1 clutch and the switchover of the B3 brake and the B1 brake are stepwise performed, there is no need for completely implementing the intermediate gear and hence it is possible to complete a shift action for a short time.

Since there is no need for completely implementing the intermediate gear, a change in the revolution speed of the engine is not stagnated in the middle of the shift. Therefore, it is possible to improve a response property of the shift.

Further, it is possible to suppress the shift shock at the time of engaging the C1 clutch by engaging the C1 clutch at the time of synchronizing with the fourth gear. It is also possible to suppress the shift shock at the time of engaging the B1 brake by engaging the B1 brake at the time of synchronizing with the second gear. Therefore, it is possible to provide the control apparatus and a control method for the automatic transmission of improving the response property of the shift and preventing the shift shock at the same time.

It should be noted that although the shift action is described taking the direct shift from the fifth gear to the second gear as an example in the present embodiment, the shift is not particularly limited to this as long as requiring the switchover of both the clutch elements (input elements) and the brake elements (reaction elements).

For example, C2 clutch 3650 and B1 brake 3610 are engaged in the sixth gear. In a case where the direct shift from the sixth gear to the third gear is performed, C2 clutch 3650 is switched over to C1 clutch 3640 and B1 brake 3610 is switched over to B3 brake 3630.

That is, at the time of the shift from the sixth gear to the third gear, the disengagement control is performed so as to completely disengage B1 brake 3610 and the half-engagement control is performed so as to set C2 clutch 3650 to preliminarily fixed control pressure. It should be noted that the "preliminarily fixed control pressure" is similar to the preliminarily fixed control pressure at the time of the shift from the fifth gear to the second gear mentioned above.

Then, the engagement control on C1 clutch 3640 is started at the time point of synchronizing with the fourth gear. At this time, since C1 clutch 3640 is engaged and C2 clutch 3650 is half-engaged, a gear close to the fourth gear is implemented. Then, B3 brake 3630 is engaged at a time point of synchronizing with the third gear. Thereby, without generating the shift shock, it is possible to complete the shift from the sixth gear to the third gear for a short time.

Further, in the present embodiment, set time period Ts (1) may be set to be the preliminarily fixed time period. However, by learning in accordance with a state of automatic transmission 2000, a learned time period may be updated as a new set time period Ts (1).

This is because there is a possibility that positive torque may be generated in automatic transmission 2000 when engagement timing of C1 clutch 3640 is late (that is, set time period Ts (1) is large).

For example, the direct shift from the fifth gear to the second gear is supposed. After the disengagement control is performed on B3 brake 3630 and the half-engagement control is performed on C2 clutch 3650 as shown in (A) and (B) of FIG. 9, C1 clutch 3640 is engaged at time Tc (0) as shown in (C) of FIG. 9. At this time, when the engagement timing of C1 clutch 3640 is late, C1 clutch 3640 is engaged over a time point when turbine revolution speed NT reaches the revolution speed of synchronizing with the fourth gear. Therefore, turbine revolution speed NT is reduced to the revolution speed of synchronizing with the fourth gear with C1 clutch 3640 being engaged. Thereby, the shift shock on the side of the positive torque is generated at Tc (1) as shown in (F) of FIG. 9.

Figure 9:
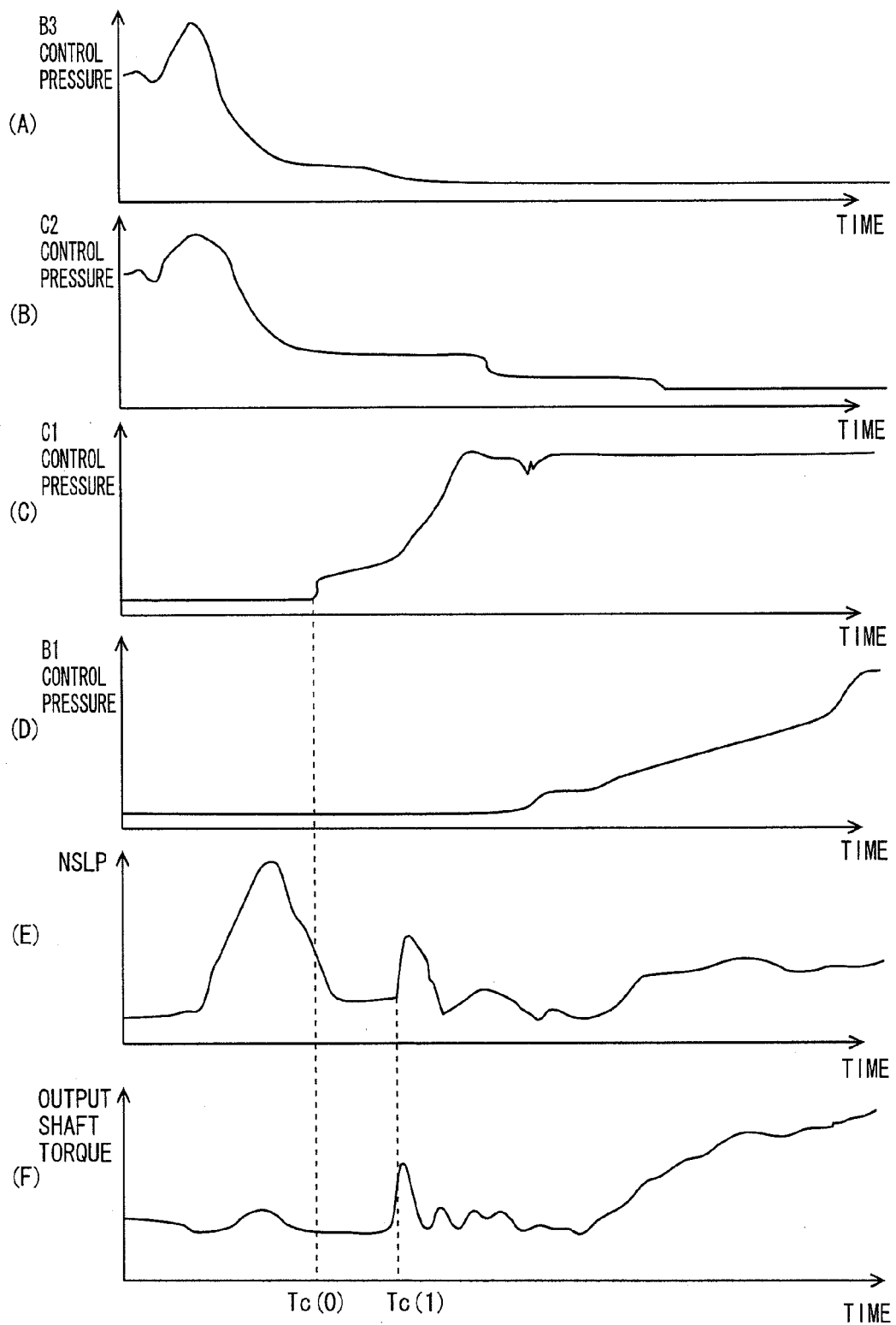
FIG. 9 is a diagram for illustrating shift shock generated when engagement timing of the clutch element is late.

It should be noted that when the revolution speed is reduced in such a way, a difference between the input shaft revolution speed and the output shaft revolution speed of torque converter 3200 (NSLP in the following description) is increased at time Tc (1) as shown in (E) of FIG. 9 and the slip is generated. That is, in a case where the generation of the slip in torque converter 3200 is detected after the timing of engaging C1 clutch 3640, it is possible to determine that the above reduction of the revolution speed is generated.

Figure 10:
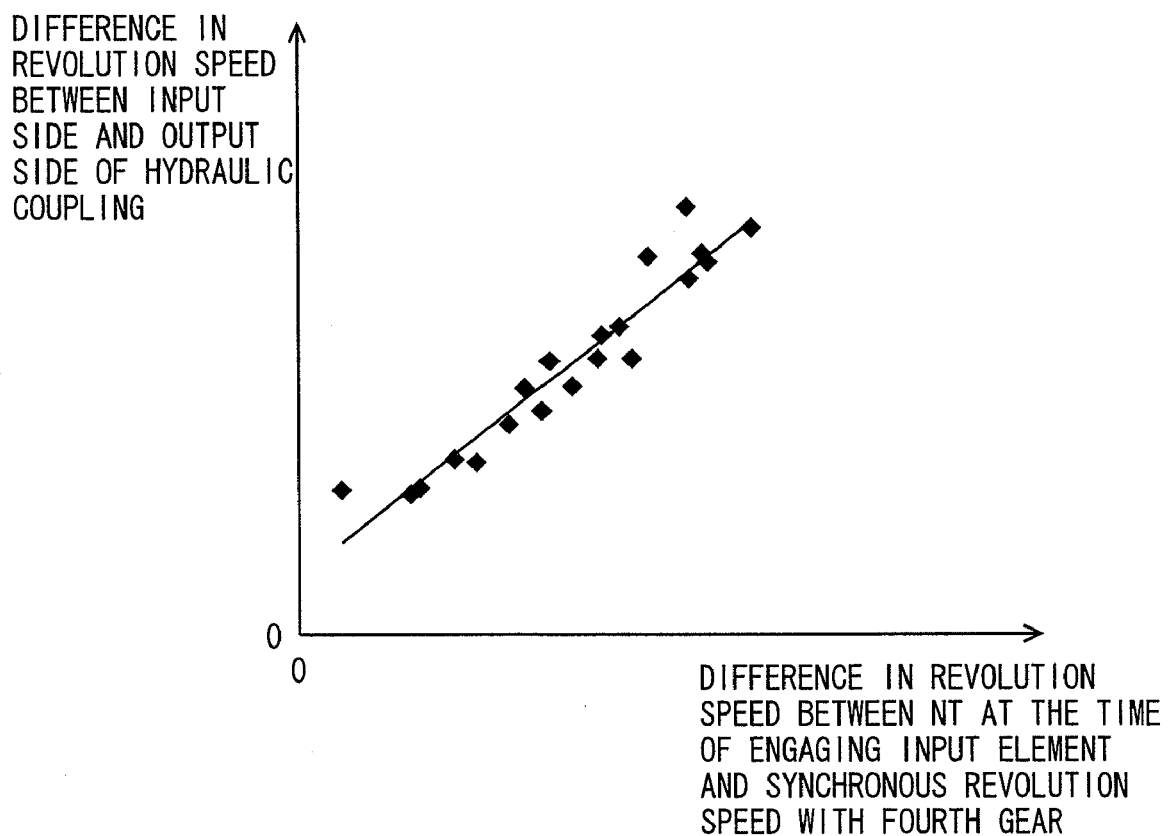
FIG. 10 is a diagram showing a relationship between a difference between the input shaft revolution speed and the output shaft revolution speed of a torque converter and a difference between the turbine revolution speed at the time of engagement and the synchronous revolution speed with the fourth-gear.

As shown in FIG. 10, the difference in the revolution speed between the input side and the output side of torque converter 3200 has a substantially proportional relationship with the difference between turbine revolution speed NT at the time of engaging C1 clutch 3640 and the revolution speed of synchronizing with the fourth gear. It should be noted that a horizontal axis of FIG. 10 indicates the revolution speed serving as the difference between turbine revolution speed NT at the time of engaging C1 clutch 3640 serving as the input element and the revolution speed of synchronizing with the fourth gear. A vertical axis of FIG. 10 indicates the revolution speed serving as the difference between the input shaft revolution speed and the output shaft revolution speed of torque converter 3200 serving as a fluid coupling. As shown in FIG. 10, when the revolution speed serving as the difference between turbine revolution speed NT and the revolution speed of synchronizing with the fourth gear is large, the revolution speed serving as the difference between the input shaft revolution speed and the output shaft revolution speed of torque converter 3200 tends to be increased in proportion.

Therefore, set time period Ts (1) may be learned based on the input shaft revolution speed and the output shaft revolution speed of torque converter 3200 serving as the fluid coupling.

Hereinafter, with reference to FIG. 11, a control structure of a program for learning set time period Ts (1) to be executed by ECU 8000 serving as the control apparatus for the automatic transmission according to the present embodiment will be described.

In S200, ECU 8000 determines whether or not power-on downshift control is currently performed. The "power-on downshift control" indicates downshift control where the relationship between the accelerator pedal position and the vehicle speed in the shift map is changed by pressing the accelerator pedal by the driver so as to cross the downshift lines. When the power-on downshift control is currently performed (YES in S200), the processing is moved to S202. If not (NO in S200), this processing is finished.

In S202, ECU 8000 determines whether or not a learning permission condition is satisfied. The "learning permission condition" includes for example, an oil temperature condition (a condition that an oil temperature is equal to or smaller than a preliminarily fixed temperature), an input torque condition (a condition that input torque (the engine revolution speed) is equal to or smaller than preliminarily fixed torque (revolution speed)), a vehicle speed condition (a condition that the vehicle speed is equal to or smaller than preliminarily fixed vehicle speed), an accelerator pedal position condition (a condition that a time variation of the accelerator pedal position is equal to or smaller than a preliminarily fixed variation), and a condition that complex and multiple shift control is not executed. The learning permission condition may be a condition that the learning is not performed in a state that accuracy of learning is not ensured, and may include at least the above conditions. When the learning permission condition is satisfied (YES in S202), the processing is moved to S204. If not (NO in S202), this processing is finished.

In S204, ECU 8000 determines whether or not an NSLP detection condition is satisfied. Here, the "NSLP" indicates a slip amount in torque converter 3200 and is calculated from the difference between the input shaft revolution speed and the output shaft revolution speed of torque converter 3200. The input shaft revolution speed of torque converter 3200 is detected by engine speed sensor 8020. The output shaft revolution speed of torque converter 3200 is detected by input shaft speed sensor 8022.

The "NSLP detection condition" indicates a condition that turbine revolution speed NT is equal to or larger than the revolution speed of synchronizing with the fourth gear serving as the intermediate gear at the time of the direct shift from the fifth gear to the second gear for example. When the NSLP detection condition is satisfied (YES in S204), the processing is moved to S206. If not (NO in S204), the processing is returned to S202.

In S206, ECU 8000 determines whether or not the NSLP is within a preliminarily fixed range. The preliminarily fixed range is adjusted by an experiment or the like for example.

When the NSLP is within the preliminarily fixed range (YES in S206), this processing is finished. If not (NO in S206), the processing is moved to S208.

In S208, ECU 8000 updates a learning value. Specifically, ECU 8000 shortens set time period Ts (1) by a preliminarily fixed time period and puts the engagement timing of C1 clutch 3640 earlier. It should be noted that ECU 8000 may preliminarily store a relationship between set time period Ts (1) and the NSLP as a map, a table or a mathematical expression for example.

An action of learning set time period Ts (1) by ECU 8000 serving as the control apparatus for the automatic transmission according to the present embodiment based on the above flowchart will be described.

For example, the direct shift from the fifth gear to the second gear by pressing the accelerator pedal by the driver is supposed. When the shift is started, the power-on downshift control is performed (YES in S200). Therefore, it is determined whether or not the learning permission condition is satisfied (S202).

When all the learning permission conditions including the oil temperature condition, the input torque condition, the vehicle speed condition, the accelerator pedal position condition and the condition that the complex and multiple shift control is not executed are satisfied (YES in S202) and turbine revolution speed NT is the revolution speed of synchronizing with the fourth gear (YES in S204), the NSLP is detected.

That is, a difference between engine revolution speed NE and turbine revolution speed NT is calculated. At this time, the detected NSLP is not within the preliminarily fixed range (NO in S206), the learning value is updated (S208). That is, the update is performed so as to shorten set time period Ts (1) by the preliminarily fixed time period.

When set time period Ts (1) is newly set so as to be shorten, the engagement timing of C1 clutch 3640 is put earlier. Therefore, since the engagement of C1 clutch 3640 is performed at a proper time point, the reduction of turbine revolution speed NT at the time of engaging C1 clutch 3640 is suppressed. Consequently, since the generation of the positive torque is suppressed, it is possible to suppress the shift shock at the time of engaging C1 clutch 3640.

Meanwhile, when the engagement timing of C1 clutch 3640 is early (that is, set time period Ts (1) is small), turbine revolution speed NT is reduced to the revolution speed of synchronizing with the fourth gear serving as the intermediate gear. Therefore, there is a possibility that negative torque may be generated in automatic transmission 2000.

Figure 12:
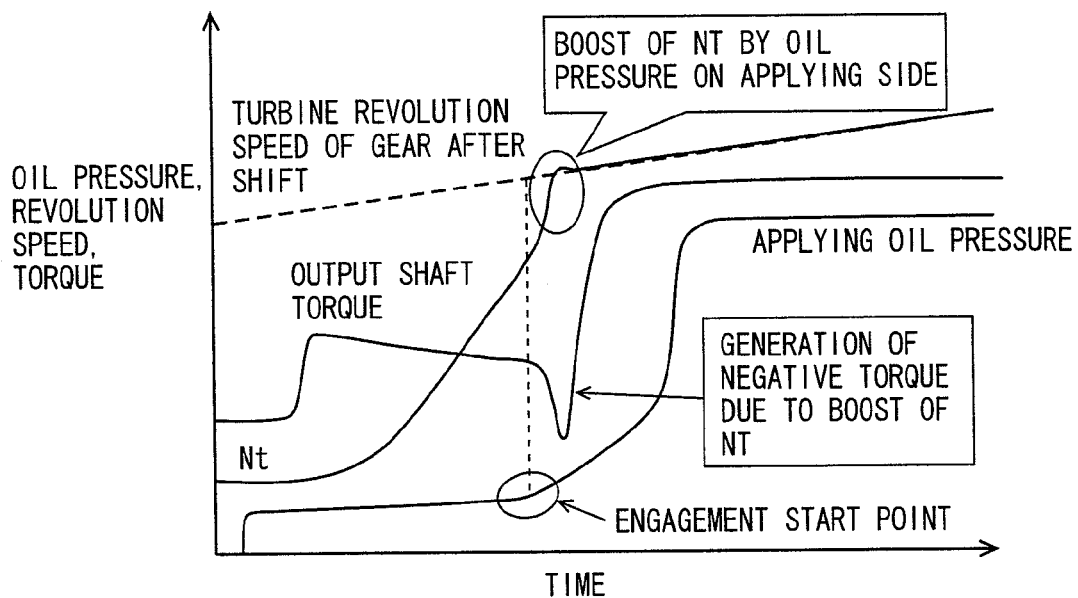
FIG. 12 is a diagram for illustrating shift shock generated when the engagement timing of the clutch element is early.

As shown in FIG. 12, when an engagement start point of C1 brake 3640 is earlier than a time point of synchronizing with the intermediate gear (the fourth gear in the present embodiment), the gear comes close to the fourth gear in a state that turbine revolution speed NT is not yet increased to the revolution speed of synchronizing with the fourth gear. Therefore, since turbine revolution speed NT is boosted to the revolution speed of synchronizing with the fourth gear, a change rate of the increase in turbine revolution speed NT is increased. At this time, since the output shaft torque is changed to the side of the negative torque, the shift shock is generated.

Figure 13:
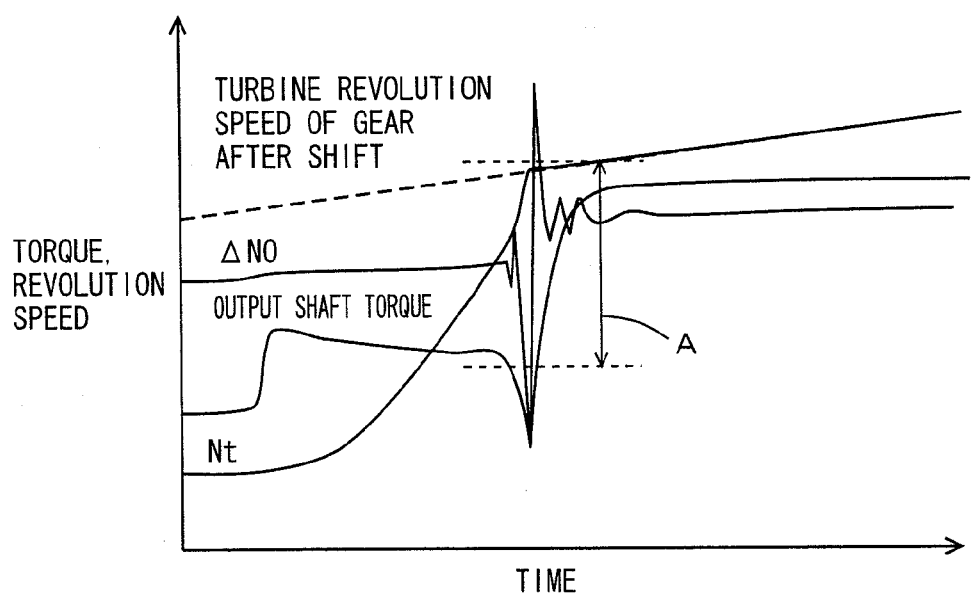
FIG. 13 is a timing chart showing a change in ΔNO at the time of generating the shift shock.

As shown in FIG. 13, in a case where such negative torque is generated, a time variation ΔNO of the output shaft revolution speed of automatic transmission 2000 is largely changed. That is, in a case where time variation ΔNO of the output shaft revolution speed is large in the middle of the shift, it is possible to determine that boost of the revolution speed mentioned above is generated.

Therefore, set time period Ts (1) may be learned based on the time variation of the output shaft revolution speed of automatic transmission 2000.

Figure 14:
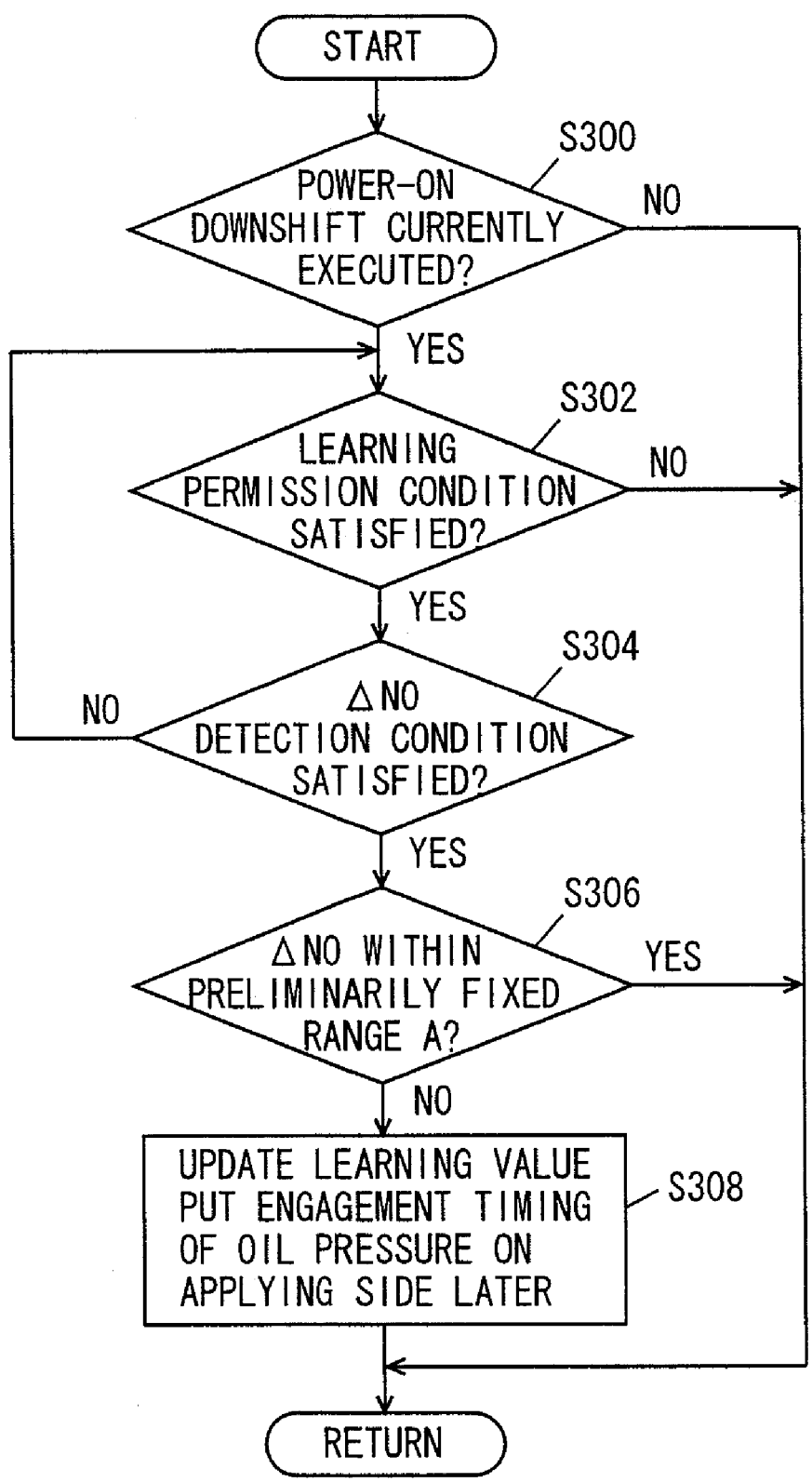
FIG. 14 is a flowchart of a program of learning a set value Ns to be executed by the ECU serving as the control apparatus for the automatic transmission according to the present embodiment.

Hereinafter, with reference to FIG. 14, a control structure of a program for learning set time period Ts (1) to be executed by ECU 8000 serving as the control apparatus for the automatic transmission according to the present embodiment will be described.

In S300, ECU 8000 determines whether or not the power-on downshift control is currently performed. When the power-on downshift control is currently performed (YES in S300), the processing is moved to S302. If not (NO in S300), this processing is finished.

In S302, ECU 8000 determines whether or not a learning permission condition is satisfied. It should be noted that the "learning permission condition" will be described as the same condition as the "learning permission condition" mentioned above but may be a different condition. When the learning permission condition is satisfied (YES in S302), the processing is moved to S304. If not (NO in S302), this processing is finished.

In S304, ECU 8000 determines whether or not a ΔNO detection condition is satisfied. The "ΔNO detection condition" indicates a condition that an absolute value of the difference between turbine revolution speed NT and the revolution speed of synchronizing with the fourth gear is equal to or smaller than a preliminarily fixed value at the time of the direct shift from the fifth gear to the second gear for example. When the ΔNO detection condition is satisfied (YES in S304), the processing is moved to S306. If not (NO in S304), the processing is returned to S302.

In S306, ECU 8000 determines whether or not ΔNO is within a preliminarily fixed range A. ECU 8000 calculates a time variation of output shaft revolution speed NO detected from output shaft speed sensor 8024. Preliminarily fixed range A is adjusted by an experiment or the like for example. Preliminarily fixed range A is regulated by an upper limit value and a lower limit value of ΔNO as shown in FIG. 13 for example. When calculated ΔNO is equal to or smaller than the upper limit value of preliminarily fixed range A and equal to or larger than the lower limit value, ECU 8000 determines that ΔNO is within preliminarily fixed range A. When ΔNO is within preliminarily fixed range A (YES in S306), this processing is finished. If not (NO in S306), the processing is moved to S308.

In S308, ECU 8000 updates the learning value. Specifically, ECU 8000 extends set time period Ts (1) by a preliminarily fixed value and put the engagement timing of C1 brake 3640 later. It should be noted that ECU 8000 may preliminarily store a relationship between ΔNO and set time period Ts (1) as a map, a table or a mathematical expression for example.

An action of learning set time period Ts (1) by ECU 8000 serving as the control apparatus for the automatic transmission according to the present embodiment based on the above flowchart will be described.

For example, the direct shift from the fifth gear to the second gear by pressing the accelerator pedal by the driver is supposed. When the shift is started, the power-on downshift control is performed (YES in S300). Therefore, it is determined whether or not the learning permission condition is satisfied (S302).

When all the learning permission conditions including the oil temperature condition, the input torque condition, the vehicle speed condition, the accelerator pedal position condition and the condition that the complex and multiple shift control is not executed are satisfied (YES in S302) and the absolute value of the difference between the turbine revolution speed and the revolution speed of synchronizing with the fourth gear is equal to or smaller than the preliminarily fixed value (YES in S304), ΔNO is detected. That is, the time variation of output shaft revolution speed NO of automatic transmission 2000 is calculated. At this time, when calculated ΔNO is not within preliminarily fixed range A (NO in S306), the learning value is updated (S308). That is, set time period Ts (1) is updated so as to be extended by the preliminarily fixed value.

When set time period Ts (1) is newly set so as to be extended, the engagement timing of C1 brake 3640 is put later. Therefore, since the engagement of C1 brake 3640 is performed at a proper time point, the boost of turbine revolution speed NT at the time of engaging C1 brake 3640 is suppressed. Consequently, since generation of the negative torque is suppressed, it is possible to suppress the shift shock at the time of engaging C1 brake 3640.

The embodiment disclosed herein is not restrictive but an example in all respects. A scope of the present invention is not shown by the above description but claims. The present invention should include all variations within similar meanings and ranges to the claims.

The invention claimed is:

1. A control apparatus for an automatic transmission where a gear of a first gear ratio is implemented by engaging a first friction element and engaging a second friction element, and a gear of a second gear ratio is implemented by engaging a third friction element and engaging a fourth friction element both different from said first friction element and said second friction element, said automatic transmission including a fluid coupling with an input shaft coupled to a power source and a transmission mechanism connected to an output shaft of said fluid coupling, said control apparatus comprising:
a first disengagement controller to lower engagement force of said first friction element so as to disengage said first friction element at the time of a shift from said gear of said first gear ratio to said gear of said second gear ratio;
a half-engagement controller to lower engagement force of said second friction element to preliminarily fixed engagement force with the disengagement of said first friction element;
a first engagement controller to increase engagement force of said third friction element at a first time point after starting said shift;
a second disengagement controller to further lower the engagement force of said second friction element so as to disengage said second friction element with the engagement of said third friction element; and
a second engagement controller to increase engagement force of said fourth friction element at a second time point later than said first time point;
a first detector to detect an input shaft revolution speed of said fluid coupling;
a second detector to detect an output shaft revolution speed of said fluid coupling; and
a learning unit to learn said first time point based on said input shaft revolution speed and said output shaft revolution speed.

2. The control apparatus for the automatic transmission according to claim 1, wherein
said first time point is substantially the same as a time point when the input shaft revolution speed of said transmission mechanism is the revolution speed of synchronizing with an intermediate gear implemented by the engagement of said second friction element and the engagement of said third friction element.

3. The control apparatus for the automatic transmission according to claim 2, wherein
said first time point is a time point of passing a set time period corresponding to a time point of synchronizing with said intermediate gear after a time point when said first friction element or said second friction element is disengaged.

4. The control apparatus for the automatic transmission according to claim 1, wherein
said learning unit learns said first time point based on a difference between said input shaft revolution speed and said output shaft revolution speed.

5. The control apparatus for the automatic transmission according to claim 4, wherein
said learning unit learns that said first time point is put earlier as the difference between said input shaft revolution speed and said output shaft revolution speed is larger.

6. The control apparatus for the automatic transmission according to claim 1, wherein
said control apparatus further includes an input shaft revolution speed detector to detect the input shaft revolution speed of said transmission mechanism, and
said second time point is a time point when a difference between said detected input shaft revolution speed and the revolution speed of synchronizing with said gear of said second gear ratio is equal to or smaller than a set value.

7. The control apparatus for the automatic transmission according to claim 1, wherein said preliminary fixed engagement force is engagement force of regulating a rotation element of said automatic transmission until said third friction element is engaged after starting the engagement and a slip is generated in said second friction element engaged by said preliminary fixed engagement force due to torque transmitted via said rotation element when said third friction element is engaged.

8. A control apparatus for an automatic transmission where a gear of a first gear ratio is implemented by engaging a first friction element and engaging a second friction element, and a gear of a second gear ratio is implemented by engaging a third friction element and engaging a fourth friction element both different from said first friction element and said second friction element, said automatic transmission including a fluid coupling with an input shaft coupled to a power source and a transmission mechanism connected to an output shaft of said fluid coupling,
said control apparatus comprising:
a first disengagement controller to lower engagement force of said first friction element so as to disengage said first friction element at the time of a shift from said gear of said first gear ratio to said gear of said second gear ratio;
a half-engagement controller to lower engagement force of said second friction element to preliminarily fixed engagement force with the disengagement of said first friction element;
a first engagement controller to increase engagement force of said third friction element at a first time point after starting said shift;
a second disengagement controller to further lower the engagement force of said second friction element so as to disengage said second friction element with the engagement of said third friction element;
a second engagement controller to increase engagement force of said fourth friction element at a second time point later than said first time point;

an output shaft revolution speed detector to detect the output shaft revolution speed of said transmission mechanism; and a time point learning unit to learn said first time point based on said detected output shaft revolution speed, said time point learning unit learns said first time point based on a time variation of said detected output shaft revolution speed.

9. A control method for an automatic transmission where a gear of a first gear ratio is implemented by engaging a first friction element and engaging a second friction element, and a gear of a second gear ratio is implemented by engaging a third friction element and engaging a fourth friction element both different from said first friction element and said second friction element, said automatic transmission including a fluid coupling with an input shaft coupled to a power source and a transmission mechanism connected to an output shaft of said fluid coupling, said control method comprising the steps of lowering engagement force of said first friction element so as to disengage said first friction element at the time of a shift from said gear of said first gear ratio to said gear of said second gear ratio;

lowering engagement force of said second friction element to preliminarily fixed engagement force with the disengagement of said first friction element;

increasing engagement force of said third friction element at a first time point after starting said shift;

further lowering the engagement force of said second friction element so as to disengage said second friction element with the engagement of said third friction element;

increasing engagement force of said fourth friction element at a second time point later than said first time point;

detecting an input shaft revolution speed of said fluid coupling;

detecting an output shaft revolution speed of said fluid coupling; and learning said first time point based on said input shaft revolution speed and said output shaft revolution speed.

10. The control method for the automatic transmission according to claim 9, wherein said automatic transmission includes a fluid coupling with an input shaft coupled to a power source and a transmission mechanism connected to an output shaft of said fluid coupling, and said first time point is substantially the same as a time point when the input shaft revolution speed of said transmission mechanism is the revolution speed of synchronizing with an intermediate gear implemented by the engagement of said second friction element and the engagement of said third friction element.

11. The control method for the automatic transmission according to claim 10, wherein said first time point is a time point of passing a set time period corresponding to a time point of synchronizing with said intermediate gear after a time point when said first friction element or said second friction element is disengaged.

12. The control method for the automatic transmission according to claim 9, wherein said step of learning includes the step of learning said first time point based on a difference between said input shaft revolution speed and said output shaft revolution speed.

13. The control method for the automatic transmission according to claim 12, wherein said step of learning includes the step of learning that said first time point is put earlier as the difference between said input shaft revolution speed and said output shaft revolution speed is larger.

14. The control method for the automatic transmission according to claim 9, wherein said control method further includes the step of detecting the input shaft revolution speed of said transmission mechanism, and said second time point is a time point when a difference between said detected input shaft revolution speed and the revolution speed of synchronizing with said gear of said second gear ratio is equal to or smaller than a set value.

15. The control method for the automatic transmission according to claim 9, wherein said preliminary fixed engagement force is engagement force of regulating a rotation element of said automatic transmission until said third friction element is engaged after starting the engagement and a slip is generated in said second friction element engaged by said preliminary fixed engagement force due to torque transmitted via said rotation element when said third friction element is engaged.

* * * * *